(12) United States Patent
Sumiyashiki

(10) Patent No.: US 7,681,825 B2
(45) Date of Patent: Mar. 23, 2010

(54) WEBBING RETRACTOR

(75) Inventor: Akira Sumiyashiki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 42 days.

(21) Appl. No.: 12/038,710

(22) Filed: Feb. 27, 2008

(65) Prior Publication Data

US 2008/0210802 A1 Sep. 4, 2008

(30) Foreign Application Priority Data

Mar. 1, 2007 (JP) .............................. 2007-051950

(51) Int. Cl.
*B60R 22/38* (2006.01)
(52) U.S. Cl. ................. 242/383.1; 242/383.2
(58) Field of Classification Search ... 242/383.1–383.5, 242/384.6, 375.1
See application file for complete search history.

(56) References Cited

U.S. PATENT DOCUMENTS

| | | | |
|---|---|---|---|
| 6,523,771 B2 * | 2/2003 | Sumiyashiki | 242/383.2 |
| 6,527,214 B2 * | 3/2003 | Sumiyashiki | 242/383.2 |
| 6,530,536 B2 * | 3/2003 | Sumiyashiki et al. | 242/383.2 |
| 6,883,742 B2 * | 4/2005 | Sumiyashiki et al. | 242/383.1 |
| 2008/0191083 A1 * | 8/2008 | Sumiyashiki | 242/382.2 |

FOREIGN PATENT DOCUMENTS

| | | | |
|---|---|---|---|
| CN | 1493482 A | | 5/2004 |
| JP | 5-246303 A | | 9/1993 |

OTHER PUBLICATIONS

Chinese Office Action dated May 22, 2009 from corresponding Chinese Patent Application No. 200810082812.X.

* cited by examiner

*Primary Examiner*—Sang Kim
(74) *Attorney, Agent, or Firm*—Roberts Mlotkowski Safran & Cole, P.C.; Thomas W. Cole

(57) ABSTRACT

By adjusting phases of a webbing sensor and a locking mechanism when a spool locking section operates, special precision and rigidity are not required of respective members, and operation is stabilized. In a webbing retractor, at a time when a lock pawl meshes with a ratchet tooth of a ratchet member, if the lock pawl meshes with an Nth ratchet tooth and a sensor pawl meshes with an (N−1)st internal tooth, a release pawl is moved from a restraining position to a restraint cancelled position against urging force of a torsion coil spring and due to torque in a clockwise direction which teeth surfaces generate. When a gear ring rotates to a position at which a phase difference with the ratchet member substantially disappears, the release pawl is returned to the restraining position by the urging force of the torsion coil spring.

5 Claims, 11 Drawing Sheets

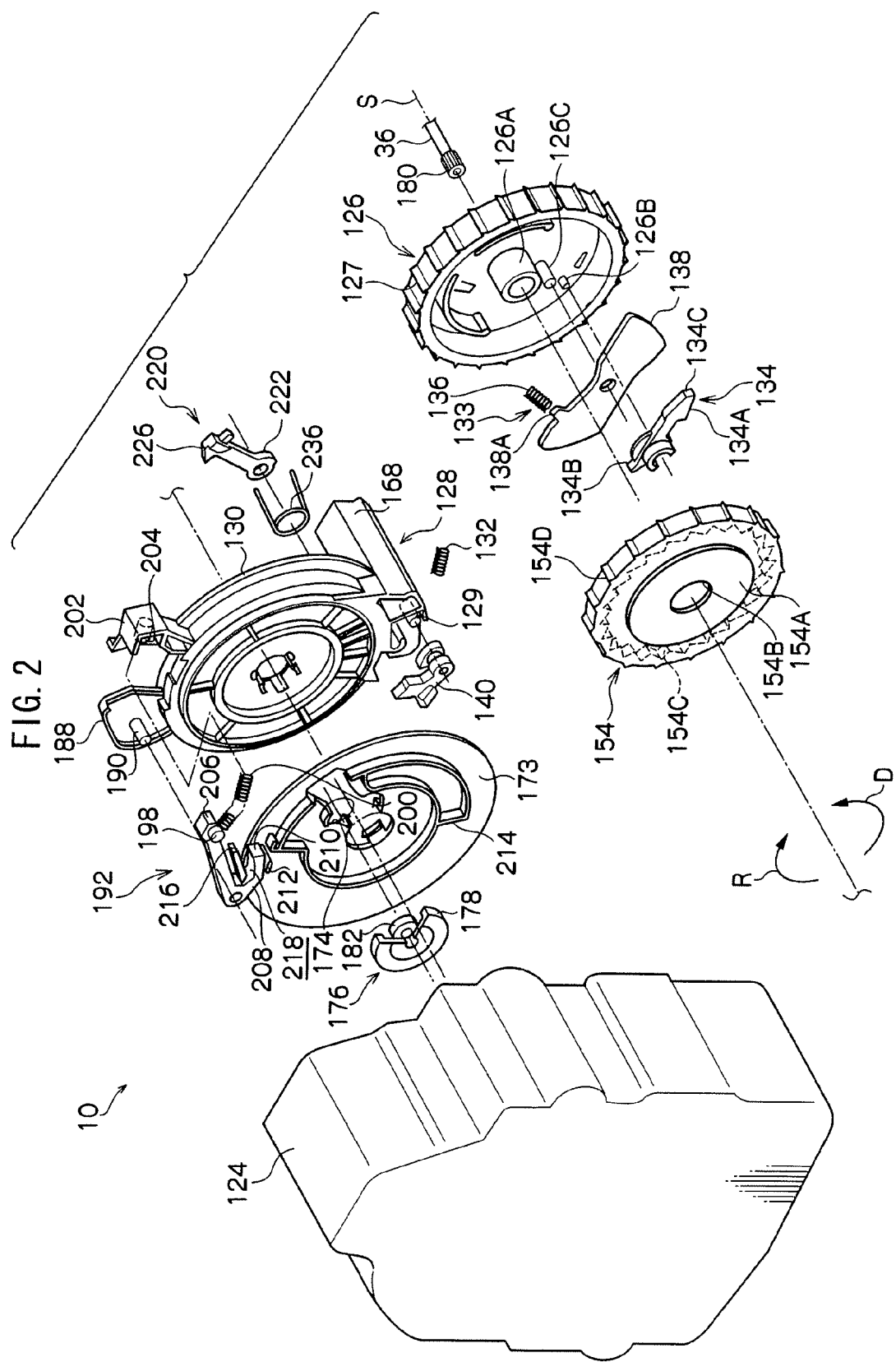

WEBBING RETRACTOR

CROSS-REFERENCE TO RELATED APPLICATION

This application claims priority under 35 USC 119 from Japanese Patent Application No. 2007-051950, the disclosure of which is incorporated by reference herein.

BACKGROUND

1. Field of the Invention

The present invention relates to a webbing retractor that takes-up and accommodates a webbing belt for restraining the body of a vehicle occupant seated in a seat.

2. Related Art

A locking mechanism, which restricts rotation of a reel shaft (a spool) in a pull-out direction at a time of rapid deceleration of a vehicle, is provided at a webbing retractor which structures a seat belt device of a vehicle, as disclosed in Japanese Patent Application Laid-Open (JP-A) No. 5-246303 for example. A lock gear, which structures the locking mechanism disclosed in JP-A No. 5-246303, is able to rotate coaxially with and relative to the reel shaft. When the reel shaft rotates in the pull-out direction relative to the lock gear, interlockingly with this relative rotation, respective teeth of a main pawl and a back-up pawl engage with internal teeth which are formed at both side walls of a frame, and rotation of the reel shaft in the pull-out direction is restricted.

As one structure for causing relative rotation between the reel shaft and the lock gear, there is an inertial body which is provided at the lock gear. The inertial body is connected to the lock gear by a spring. When the lock gear rotates suddenly in the pull-out direction together with the reel shaft, a delay in rotation with respect to the lock gear arises at the inertial body due to inertia and against the urging force of the spring. Accompanying this relative rotation with respect to the lock gear which is due to the delay in rotation, an anchor claw formed integrally with the inertial body moves outwardly in the rotation radius direction of the lock gear. The anchor claw engages with a ratchet tooth which is an internal tooth formed at the inner peripheral surface of a first cover of the lock gear, and rotation of the inertial body, and accordingly of the lock gear, is stopped. Due to the rotation of the lock gear being stopped in this way, the lock gear rotates relative to the reel shaft which rotates in the pull-out direction.

In such a webbing retractor which operates the locking mechanism from a webbing sensor, high precision and rigidity are required of the respective members in order to match the engagement phase of the anchor claw of the inertial body and the ratchet tooth which is an internal tooth of the lock gear, and the engagement phase of the main pawl and an internal tooth of the frame.

SUMMARY OF THE INVENTION

In view of the aforementioned, the present invention provides a webbing retractor in which operations of a webbing sensor and a locking mechanism can be stabilized by adjusting the phases of the webbing sensor and the locking mechanism.

A webbing retractor relating to a first aspect of the present invention includes: a spool on which an elongated belt-shaped webbing is taken-up, and which is rotatable in a take-up direction and in a pull-out direction that is opposite to the take-up direction; a first rotating body that is disposed coaxially with the spool and is rotatable relative to the spool; a rotation controlling mechanism that stops rotation of the first rotating body in at least either one of a case where rotation of the spool in the pull-out direction exceeds a predetermined speed or a case where rapid deceleration of a vehicle is detected; and a locking mechanism that, when the first rotating body rotates relative to the spool due to actuation of the rotation controlling mechanism, impedes rotation of the spool in the pull-out direction by actuation such that a phase of the locking mechanism is as the same as that of the rotation controlling mechanism, wherein, by providing a phase adjusting mechanism that adjusts phases of the rotation controlling mechanism and the locking mechanism between the rotation controlling mechanism and the locking mechanism, the rotation controlling mechanism and the locking mechanism activate at the same phase.

A webbing retractor relating to a second aspect of the present invention has the feature that, in the webbing retractor relating to the first aspect, the phase adjusting mechanism includes a second rotating body that is disposed coaxially with the spool and is rotatable relative to the spool; and the phase adjusting mechanism carries out phase adjustment of the rotation controlling mechanism and the locking mechanism by rotation of the second rotating body.

A webbing retractor relating to a third aspect of the present invention has the feature that, in the webbing retractor relating to the second aspect, the phase adjusting mechanism includes a pawl that connects the second rotating body to the locking mechanism; when the pawl receives a load of a predetermined value or more from the second rotating body after the locking mechanism activates, the pawl releases connection of the second rotating body to the locking mechanism; and when load from the second rotating body disappears at the pawl, the pawl connects again the second rotating body to the locking mechanism.

A webbing retractor relating to a fourth aspect of the present invention has the feature that, in the webbing retractor relating to the third aspect, the pawl is urged by an urging member that urges the pawl with a predetermined urging force in a direction of engaging the pawl and the second rotating body; when the pawl receives a load of the predetermined value or more from the second rotating body after the locking mechanism activates, the pawl moves to an engaging-released position, at which engaging of the pawl and the second rotating body is released against the urging force, so as to allow rotation of the second rotating body; and thereafter, due to the pawl not receiving the load from the second rotating body due to releasing of engaging of the pawl and the second rotating body, the pawl moves to an engaging position, at which the pawl engages with the second rotating body, due to the urging force.

A webbing retractor relating to a fifth aspect of the present invention has the feature that, in the webbing retractor relating to the fourth aspect, a plurality of inner teeth are formed at an inner peripheral surface along a peripheral direction at the second rotating body, and a plurality of outer teeth are formed at an outer peripheral surface along the peripheral direction at the second rotating body; the pawl is able to mesh with the outer teeth of the second rotating body; the locking mechanism includes a ratchet member that is connected to the spool coaxially so as to rotate integrally with the spool, and at which a plurality of ratchet teeth are formed along a peripheral direction, and a lock pawl that is able to mesh with the ratchet teeth of the ratchet member; and a rotating body pawl that is able to mesh with the inner teeth of the second rotating body is provided at the first rotating body.

A webbing retractor relating to a sixth aspect of the present invention has the feature that, in the webbing retractor relating to the fifth aspect, angles of meshed surfaces of the pawl and the outer teeth of the second rotating body are determined such that meshing of the pawl and the outer teeth of the second rotating body is released when the pawl receives a load of the predetermined value or more from the second rotating body.

A webbing retractor relating to a seventh aspect of the present invention has the feature that, in the webbing retractor relating to the fifth aspect, due to the a phase difference being generated between the rotation controlling mechanism and the locking mechanism, when the pawl moves to the engaging-release position, the second rotating body is rotated by peripheral force generated between the spool and the second rotating body.

As described above, in accordance with the webbing retractor relating to the present invention, by adjusting the phases of a webbing sensor and a locking mechanism when a spool locking section operates, special precision and rigidity are not required of respective members, and operation can be stabilized.

BRIEF DESCRIPTION OF THE DRAWINGS

Exemplary embodiments of the invention will be described in detail with reference to the following figures, wherein:

FIG. 2 is an exploded perspective view showing the structure of a locking mechanism in the webbing retractor shown in FIG. 1;

DETAILED DESCRIPTION OF THE INVENTION

Webbing retractors relating to exemplary embodiments of the present invention will be described hereinafter with reference to the drawings.

First Exemplary Embodiment (Structure of the Exemplary Embodiment)

Figure 1:
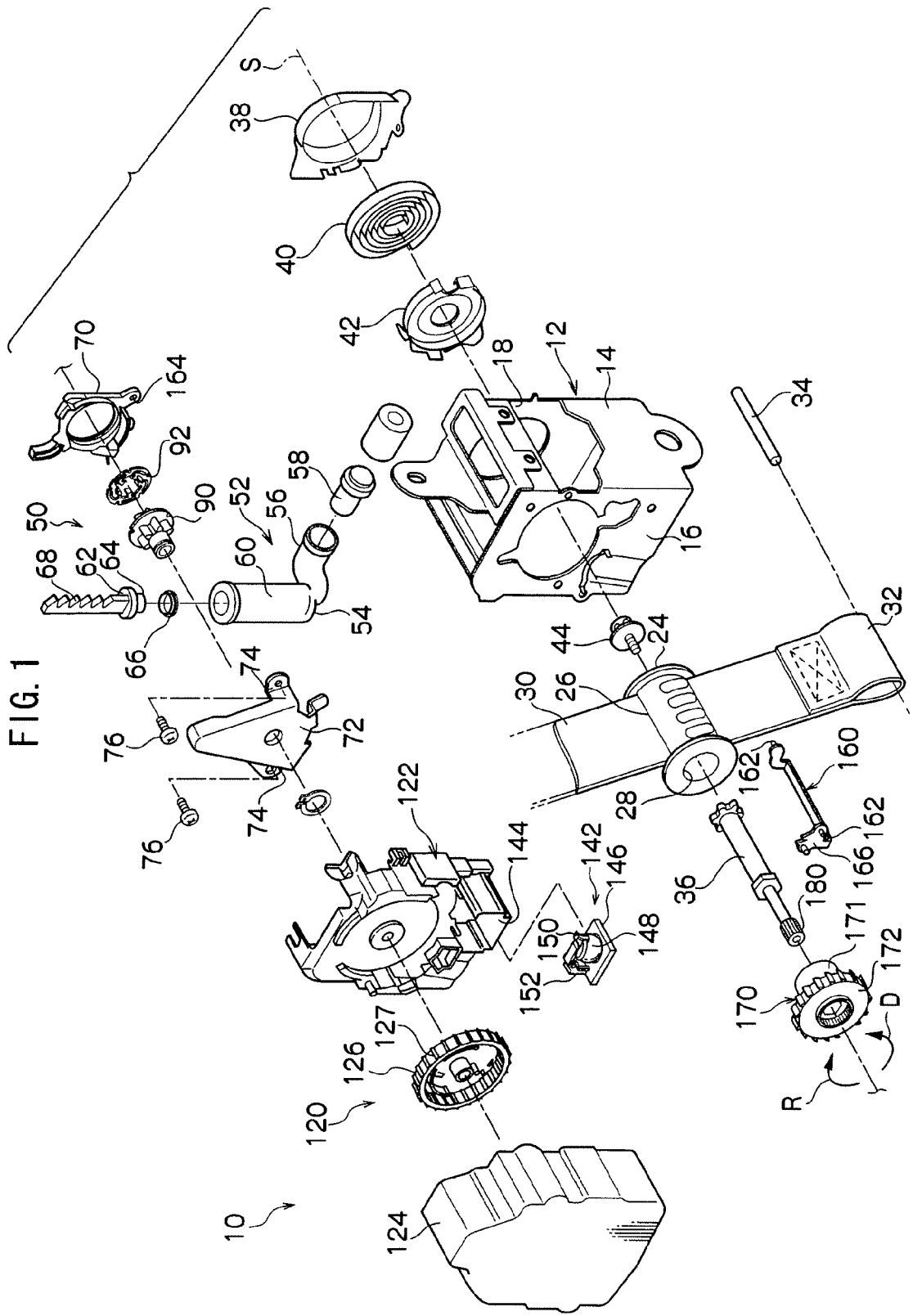
FIG. 1 is an exploded perspective view showing the overall structure of a webbing retractor relating to a first exemplary embodiment of the present invention.

The overall structure of a webbing retractor 10 relating to a first exemplary embodiment of the present invention is shown in an exploded perspective view in FIG. 1. Note that, in the drawings, reference letter S indicates the axial center of the device, and description will be given hereinafter with the direction along the axial center S being the axial direction of the device.

As shown in FIG. 1, the webbing retractor 10 has a frame 12. The frame 12 has a back plate 14 which is plate-shaped and whose direction of thickness is along, for example, the substantially left-right direction of the vehicle. The webbing retractor 10 is mounted to the vehicle body by the back plate 14 being fixed to the vehicle body, for example, in a vicinity of the lower end portion of the center pillar, by a fastening portion such as bolts or the like.

A leg plate 16 is formed so as to be bent toward the inner side in the vehicle transverse direction (the substantially left-right direction of the vehicle), from one transverse direction end of the back plate 14 which runs along the substantially vehicle longitudinal direction. Further, a leg plate 18 is formed to bend in the same direction as the leg plate 16, from the other transverse direction end of the back plate 14. A spool 24 is provided between the leg plate 16 and the leg plate 18. The spool 24 is formed substantially in the shape of a cylindrical tube whose axial direction is along the direction in which the leg plate 16 and the leg plate 18 oppose one another. An insert-through hole 26 is formed in the spool 24.

Both ends of the insert-through hole 26 open at the outer peripheral portion of the spool 24. The shapes of these openings are slit shapes which are long along the axial direction of the spool 24. The insert-through hole 26 is formed so as to sidestep a through-hole 28 which passes-through the axially central portion of the spool 24. The longitudinal direction proximal end side of an elongated-belt-shaped webbing belt 30 is inserted-through from one open end of the insert-through hole 26.

A tubular portion 32, which passes-through in the transverse direction, is formed at the longitudinal direction proximal end portion of the webbing belt 30. Due to a removal-preventing shaft 34 being disposed at the inner side of the tubular portion 32 which has passed-through the insert-through hole 26, the proximal end side of the webbing belt 30 is prevented from coming-out of the insert-through hole 26 at the time when the webbing belt 30 is pulled toward the distal end side thereof. Due to the spool 24 rotating in a predetermined take-up direction (the direction of arrow R) around the axial center S, the webbing belt 30, which is prevented from coming-out from the insert-through hole 26 in this way, is taken-up and accommodated in layers from the proximal end side thereof onto the outer peripheral portion of the spool 24.

On the other hand, a rod-shaped torsion shaft 36 which is slender along the axial direction is disposed at the inner side of the through-hole 28. The torsion shaft 36 is connected to the spool 24, in a state in which rotation of the torsion shaft 36 around the axis is prevented, at the inner side of the spool 24 at the leg plate 18 side. The leg plate 18 side end portion of the torsion shaft 36 passes-through the leg plate 18 and projects-out to the exterior of the frame 12.

A spring cover 38 is disposed at the outer side of the leg plate 18. The spring cover 38 is formed in the shape of a box which opens toward the leg plate 18 side, and is fixed to the leg plate 18 by a fastening portion such as screws or the like or by the fitting-together of fit-together claws or the like which are formed at the spring cover 38 or the leg plate 18. A spiral spring 40 is accommodated at the inner side of the spring cover 38. The spiral spring 40 is a spring which is structured such that the urging force thereof gradually increases due to the inner peripheral end in the direction of the spiral being rotated and displaced, with respect to the outer side end in the direction of the spiral, in a pull-out direction (the direction of arrow D) which is opposite to the take-up direction. The outer side end in the direction of the spiral of the spiral spring 40 is anchored on a spring seat 42 which is disposed at the open side of the spring cover 38 with respect to the spiral spring 40.

The spring seat 42 is fixed to the spring cover 38. The outer peripheral end in the direction of the spiral of the spiral spring 40 is connected to the leg plate 18 (the frame 12) via the spring seat 42 and the spring cover 38. Further, an adapter 44 is provided in a vicinity of the inner side end in the direction of the spiral of the spiral spring 40. The inner side end in the direction of the spiral of the spiral spring 40 is fixed to the outer peripheral portion of the adapter 44. Moreover, the leg plate 18 side end portion of the torsion shaft 36, which is passed-through the spring seat 42, is fit-together with and fixed to the axially central portion of the adapter 44.

On the other hand, a pretensioner mechanism 50 is provided at the axial direction outer side of the leg plate 16. In a state of rapid deceleration of the vehicle, the pretensioner mechanism 50 rotates the spool 24 in the take-up direction and takes-up the webbing belt 30. A gear case 70 is provided at the leg plate 16 side of the pretensioner mechanism 50. A cover plate 72 is provided at the side of the pretensioner mechanism 50 opposite the side at which the gear case 70 is located, and is fastened and fixed to the frame 12 by screws or the like. Therefore, even if the torsion shaft 36 rotates, a clutch 92 does not rotate, and when a pinion 90 rotates in the take-up direction, due to this rotational force, a portion of the clutch 92 deforms and connects with the torsion shaft 36 so as to rotate integrally therewith. In the exemplary embodiments of the present invention, a rack-and-pinion system, in which a rack bar 68 engages with the pinion 90, is illustrated.

A locking mechanism 120 is provided at the axial direction outer side of the leg plate 16. The locking mechanism 120 has a sensor holder 122. The sensor holder 122 is formed in a concave shape which partially opens toward the leg plate 16 side. A portion of the cover plate 72 is positioned at the inner side of the portion which opens toward the leg plate 16 side. The sensor holder 122 is fixed to the leg plate 16 due to cylindrical-tube-shaped projections, which are formed to project out toward the leg plate 16 side from predetermined regions of the outer peripheral portion of the sensor holder 122, being fit into holes which are formed at the leg plate 16, and plug pins (not shown) being press-fit in at the inner sides of the projections in this state.

At the webbing retractor 10, a sensor cover 124 is provided at the axial direction outer side of the sensor holder 122. Fit-together claws or the like are formed at the outer peripheral portion or the like of the sensor cover 124, and fit-together with predetermined regions of the sensor holder 122 such that the sensor cover 124 is mechanically connected to the sensor holder 122. An unillustrated, tubular shaft-receiving portion is formed at the sensor cover 124, and pivotally-supports the other end portion of the torsion shaft 36 which is passed-through the sensor holder 122, such that this other end portion of the torsion shaft 36 rotates freely.

A V-gear 126 which is a first rotating body is provided at the webbing retractor 10 between the sensor holder 122 and the sensor cover 124. The V-gear 126 is formed in the shape of a shallow cylindrical tube having a floor, and opens toward the sensor cover 124 side. Plural (24 in the present exemplary embodiment) ratchet teeth 127 are formed at the outer peripheral surface of the V-gear 126. The ratchet teeth 127 are arrayed at the outer peripheral surface of the V-gear 126 at a uniform pitch (a 15° pitch) along the peripheral direction. The torsion shaft 36 passes-through the central portion of the V-gear 126. The V-gear 126 is disposed coaxially with the torsion shaft 36, and is connected to the torsion shaft 36 so as to rotate integrally therewith.

As shown in FIG. 2, a gear ring 154 which is a second rotating body is disposed at the webbing retractor 10 so as to be adjacent to the axial direction outer side of the V-gear 126. The gear ring 154 is formed overall in the shape of a shallow cylindrical tube which has a floor and is concentric with the V-gear 126. The open end of the gear ring 154 opposes the V-gear 126. A floor plate portion 154A, which is disc-shaped and closes the end surface of the gear ring 154 at the side opposite the V-gear 126, is formed integrally with the gear ring 154. A circular shaft-receiving hole 154B is formed in the central portion of the floor plate portion 154A.

On the other hand, a pivot portion 126A which is shaped as a cylindrical tube is formed at the central portion of the V-gear 126 so as to project-out toward the gear ring 154. The pivot portion 126A is fit-in the shaft receiving hole 154B of the gear ring 154, so as to be able to rotate relatively. In this way, the gear ring 154 is rotatably supported by the torsion shaft 36 via the pivot portion 126A of the V-gear 126. Here, a portion of the axial direction inner side of the gear ring 154 is inserted-in at the inner peripheral side of the V-gear 126.

Plural (24 in the present exemplary embodiment) internal teeth 154C are formed at the inner peripheral surface of the gear ring 154. The internal teeth 154C are arrayed at the inner peripheral surface of the gear ring 154 at a uniform pitch (a 15° pitch) along the peripheral direction. Further, the same number (=24) of external teeth 154D as the number of internal teeth 154C are formed at the outer peripheral surface of the gear ring 154. These external teeth 154D as well are arrayed at the outer peripheral surface of the gear ring 154 at a uniform pitch (a 15° pitch) along the peripheral direction.

A lever-shaped W-pawl 134 and a webbing sensor mechanism 133 for driving the W-pawl 134 are disposed at the V-gear 126, between the inner peripheral surface of the V-gear 126 and the pivot portion 126A. An anchor claw 134A, which corresponds to the internal teeth 154C of the gear ring 154, is formed at the distal end portion of the W-pawl 134. The proximal end portion of the W-pawl 134 is connected to the V-gear 126 via a connecting shaft 126B which stands erect at the V-gear 126 in parallel with the axial center S. The W-pawl 134 is supported so as to be able to swing, around the connecting shaft 126B, between a predetermined connected position (see FIG. 4A) and connection released position (see FIG. 3A). Moreover, a lever portion 134B, which extends out toward the outer peripheral side with respect to the connecting shaft 126B, is formed integrally with the W-pawl 134 at the end portion thereof which is at the opposite side of the anchor claw 134A.

Figure 3A:
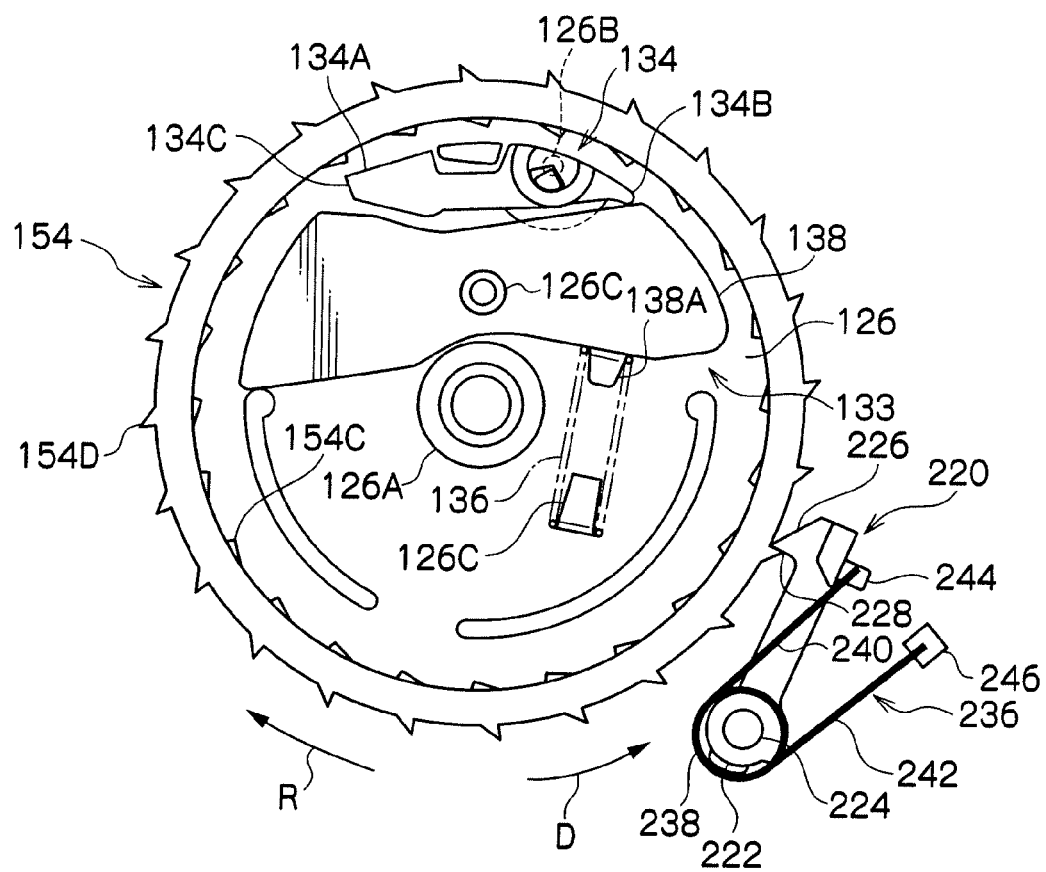
FIG. 3A is a plan view showing the structures of a V-gear and a gear ring in the webbing retractor shown in FIG. 1.

As shown in FIG. 3A, the distal end surface of the anchor claw 134A is a tooth surface 134C which has a predetermined angle of inclination with respect to the direction tangent to the pitch circle of the internal teeth 154C of the gear ring 154. Further, the take-up direction side end surfaces of the internal teeth 154C are tooth surfaces 154E which correspond to the tooth surface 134C of the anchor claw 134A. The pull-out direction sides of the tooth surfaces 154E are inclined surfaces 154F whose angle of inclination with respect to the direction tangent to the pitch circle is sufficiently small. The tooth surfaces 154E have a predetermined angle of inclination with respect to the direction tangent to the pitch circle. In the state in which the W-pawl 134 is at the connected position as shown in FIG. 4A, the tooth surface 154E can abut the tooth surface 134C of the W-pawl 134.

At the webbing retractor 10, when the W-pawl 134 is at the connection released position as shown in FIG. 3A, the anchor claw 134A of the W-pawl 134 is separated, toward the inner peripheral side, from the internal teeth 154C of the gear ring 154. In this way, the gear ring 154 does not receive interference from the V-gear 126, and can rotate relatively in both the pull-out direction (the direction of arrow D) and the take-up direction (the direction of arrow R).

Figure 4A:
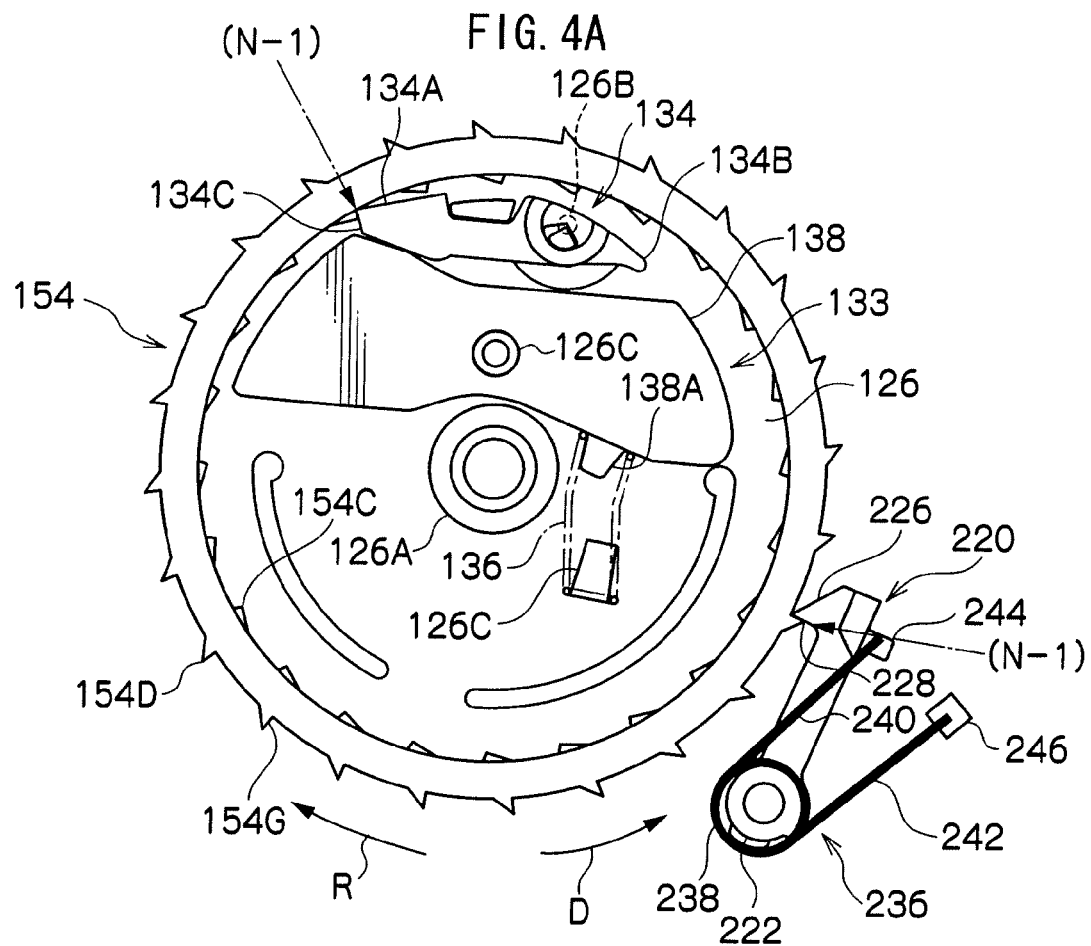
FIG. 4A is a plan view showing the structures of the V-gear and the gear ring in the webbing retractor shown in FIG. 1.

Further, at the webbing retractor 10, when the W-pawl 134 is at the connected position as shown in FIG. 4A, the anchor claw 134A of the W-pawl 134 meshes with the internal tooth 154C of the gear ring 154, and the tooth surface 134C of the W-pawl 134 abuts the tooth surface 154E of the internal tooth 154C. The V-gear 126 is thereby connected to the gear ring 154 via the W-pawl 134.

At this time, when the V-gear 126 rotates in the pull-out direction relative to the gear ring 154, torque in the pull-out direction is transmitted from the V-gear 126 to the gear ring 154, and the V-gear 126 and the gear ring 154 rotate integrally in the pull-out direction. Further, the respective angles of inclination of the tooth surface 134C of the W-pawl 134 and the tooth surface 154E of the internal tooth 154C are set so that they engage with one another. In this way, at the time when torque in the pull-out direction is transmitted, a component of force (torque) toward the axial center S acts on the W-pawl 134, and, due to this torque, the anchor claw 134A is maintained in the state of reliably engaging with the internal tooth 154C.

Oppositely of the above-described case, when the V-gear 126 rotates in the take-up direction relative to the gear ring 154, the anchor claw 134A rides along the inclined surface 154F and over the internal tooth 154C. Therefore, torque in the take-up direction is not transmitted from the V-gear 126 to the gear ring 154, and only the V-gear 126 rotates (idly rotates) in the take-up direction with respect to the gear ring 154.

As shown in FIG. 3A, the webbing sensor mechanism 133, which structures a portion of a rotation controlling mechanism, is disposed between the W-pawl 134 and the pivot portion 126A at the V-gear 126, and has an inertial body 138 and a sensor spring 136. The inertial body 138 is formed in the shape of a slender plate at the inner peripheral side, which is centered around the axial center S, with respect to the W-pawl 134. The longitudinal direction central portion of the inertial plate 138 is connected to the V-gear 126 via a connecting shaft 126C which stands erect at the V-gear 126 in parallel to the axial center S. The inertial body 138 is supported so as to be able to swing around the connecting shaft 126C between a predetermined non-operating position (see FIG. 3A) and an operating position (see FIG. 4A).

One end of the sensor spring 136 is anchored on the inertial body 138, and urges the inertial body 138 in the non-operating direction which is opposite the swinging direction (i.e., the engaging direction) of the inertial body 138 at the time when the inertial body 138 pushes the W-pawl 134 and swings the W-pawl 134.

One longitudinal direction end side at the outer peripheral end surface of the inertial body 138 which is at the non-operating position press-contacts the lever portion 134B of the W-pawl 134, and transmits the urging force of the sensor spring 136 to the W-pawl 134. In this way, the W-pawl 134 is held at the connection released position by the urging force of the sensor spring 136. Further, as shown in FIG. 4A, when the inertial body 138 moves from the non-operating position to the operating position against the urging force of the sensor spring 136, a vicinity of the anchor claw 134A of the W-pawl 134 is pushed toward the outer peripheral side by the longitudinal direction other end side at the outer peripheral end surface of the inertial body 138, and the W-pawl 134 is moved from the connection released position to the connected position.

As shown in FIG. 2, a sensor gear 128 is provided at the webbing retractor 10 at the axial direction outer side of the V-gear 126. The torsion shaft 36 passes coaxially through a main body 130 of the sensor gear 128. The main body 130 of the sensor gear 128 is pivotally-supported by the torsion shaft 36 so as to rotate freely. One end of a return spring 132 is anchored on a portion of the outer peripheral side of the sensor gear 128. The return spring 132 is a tension coil spring. The other end thereof is anchored on the sensor cover 124. The return spring 132 urges the sensor gear 128 in the take-up direction at the time when the sensor gear 128 rotates in the pull-out direction around the torsion shaft 36.

A pushing portion 168, which projects-out toward the V-gear 126, is formed at the outer peripheral portion of the main body 130 of the sensor gear 128. A shaft 129 is formed so as to project-out at the end portion of the pushing portion 168 which end portion is at the side opposite the V-gear 126. A V-pawl 140 is supported at the pushing portion 168 so as to be able to rotate around an axis which is parallel to (the same direction as) the axial direction of the torsion shaft 36. Due to the V-pawl 140 rotating, the V-pawl 140 approaches and moves away from the ratchet teeth 127 of the V-gear 126. In the state in which the V-pawl 140 has approached and engaged with the ratchet tooth 127 of the V-gear 126, if the V-gear 126 is rotating in the pull-out direction, the rotation (torque) of the V-gear 126 in the pull-out direction is transmitted to the sensor gear 128 via the V-pawl 140, and the sensor gear 128 rotates integrally with the V-gear 126 in the pull-out direction.

As shown in FIG. 1, a vehicle sensor 142 which structures a portion of the rotation controlling mechanism is provided beneath the V-pawl 140. When a predetermined deceleration acts on the vehicle, the vehicle sensor 142 senses the deceleration, and pushes the V-pawl 140 shown in FIG. 2 upward such that the V-pawl 140 meshes with the ratchet tooth 127 of the V-gear 126.

Figure 3B:
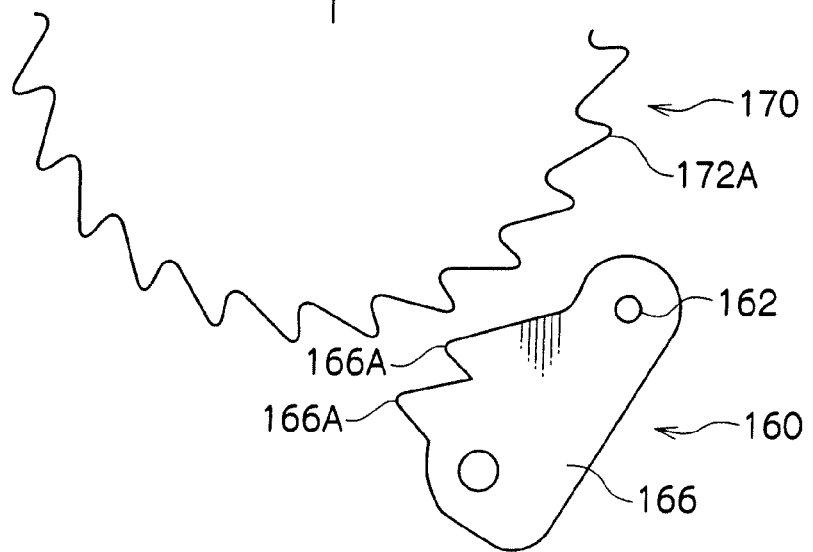
FIG. 3B is a plan view showing the structures of a ratchet member and a lock pawl in the webbing retractor shown in FIG. 1, and FIG. 3A and FIG. 3B show a state in which a W-pawl disposed at the V-gear is at an unconnected position.

As shown in FIG. 1, the locking mechanism 120 has a lock pawl 160. The lock pawl 160 has shafts 162. The axial direction of the shafts 162 is the direction parallel to (the same direction as) the axial direction of the spool 24. One end of the shafts 162 is pivotally-supported so as to rotate freely at a shaft-receiving hole (not shown) which is formed in the leg plate 18. The axial direction other end portion of the shafts 162 is pivotally-supported so as to rotate freely at a shaft-receiving hole 164 which is formed in the gear case 70. A pawl portion 166 is formed at the axial direction other end side of the shafts 162. The pawl portion 166 is a plate-shaped member whose direction of thickness is along the axial direction of the shafts 162. A pair of lock teeth 166A (see FIG. 3B) are formed at a portion of the outer periphery of the pawl portion 166.

As shown in FIG. 1, a ratchet member 170 is provided at the side of the pawl portion 166 along the rotation radius direction of the shafts 162. The ratchet member 170 has a fit-in portion 171. The fit-in portion 171 is formed in the shape of a solid cylinder, and is fit-into the other end portion of the through-hole 28 of the spool 24 coaxially with respect to the spool 24 and so as to rotate freely. The torsion shaft 36 coaxially passes through the ratchet member 170 in a rotation-prevented state, and the ratchet member 170 rotates coaxially and integrally with respect to the torsion shaft 36.

Here, the sensor spring 136, the inertial body 138, the V-pawl 140, and the vehicle sensor 142 structure at least portions of the rotation controlling mechanism relating to the present invention. Further, the sensor gear 128, the lock pawl 160 and the ratchet member 170 structure at least portions of the locking mechanism relating to the present invention.

A ratchet portion 172 is formed integrally with the leg plate 16 side of the fit-in portion 171. The ratchet portion 172 is formed coaxially with the fit-in portion 171. Ratchet teeth 172A, which can engage with the lock teeth 166A of the pawl portion 166, are formed at the outer peripheral surface of the ratchet portion 172. The same number (24) of ratchet teeth 172A as the number of internal teeth 154C and the number of external teeth 154D of the gear ring 154 are arrayed at the ratchet portion 172 at a uniform pitch (a 15° pitch) along the peripheral direction.

Due to the shafts 162 of the lock pawl 160 rotating in the take-up direction, the lock teeth 166A of the pawl portion 166 engage with the ratchet tooth 172A of the ratchet portion 172. In the state in which the pawl portion 166 and the ratchet portion 172 are engaged, rotation of the ratchet member 170 in the pull-out direction (the direction of arrow D) is restrained. Further, the pushing portion 168 of the sensor gear 128 shown in FIG. 2 corresponds to the pawl portion 166. When the main body 130 of the sensor gear 128 rotates in the pull-out direction, the pushing portion 168 pushes the pawl portion 166 and rotates the lock pawl 160 in the take-up direction (the direction of engaging with the ratchet member 170).

As shown in FIG. 3A, at the webbing retractor 10, a release pawl 220, which is shaped like a lever and is the pawl relating to the present invention and structures a portion of a phase difference adjusting mechanism (a phase adjusting mechanism), is disposed at the outer peripheral side of the gearing 154. The release pawl 220 is formed to be slender in a direction substantially parallel to the direction tangent to the pitch circle of the external teeth 154D of the gearing 154. A shaft-receiving portion 222, which is shaped as a cylindrical tube, is formed at the proximal end portion of the release pawl 220 which is one longitudinal direction end portion thereof. On the other hand, a connecting shaft 224, which is shaped as a solid cylinder, stands erect in parallel to the axial center S at the main body 130 of the sensor gear 128, at the outer peripheral side of the axial direction inner side end surface thereof. The connecting shaft 224 is fit-in at the inner peripheral side of the shaft-receiving portion 222 of the release pawl 220, so as to be able to rotate relatively. In this way, the release pawl 220 is supported so as to be able to swing around the connecting shaft 224 between a predetermined restraining position (an engaging position) (see FIG. 3A) and a restraint cancelled position (an engaging released position).

An anchor claw 226, which is wedge-shaped and projects-out toward the axial center S side, is formed at the distal end portion of the release pawl 220. A tooth surface 228, which extends along a direction intersecting the longitudinal direction of the release pawl 220, is formed at the anchor claw 226 at the end surface thereof which end surface is at the release pawl 220 proximal end side. An inclined surface 230, which is inclined in the direction of moving away from the gear ring 154, is formed from a distal end portion 228A (see FIG. 5B) of the tooth surface 228 toward the distal end side of the release pawl 220.

On the other hand, the pull-out direction side end surface of the external tooth 154D of the gear ring 154 is a tooth surface 154G which corresponds to the tooth surface 228 of the release pawl 220. The pull-out direction side of the tooth surface 154G is an inclined surface 154H which corresponds to the inclined surface 230 of the release pawl 220. The tooth surface 154G extends substantially parallel to the radial direction which is centered around the axial center S. In the state in which the release pawl 220 is at the restraining position as shown in FIG. 3A, the tooth surface 154G can abut the tooth surface 228 of the release pawl 220.

A torsion coil spring 236 is disposed at the outer peripheral side of the shaft-receiving portion 222 as an urging member for the release pawl 220. A coil portion 238, at which the spring wire is wound in a spiral shape, is formed at the central portion of the torsion coil spring 236. A pair of arm portions 240, 242, at which the spring wire is formed rectilinearly, are formed respectively at the both end sides of the coil portion 238.

Here, the gear ring 154, the release pawl 220 and the torsion coil spring 236 structure at least portions of the phase difference adjusting mechanism relating to the present invention.

Figure 5A:
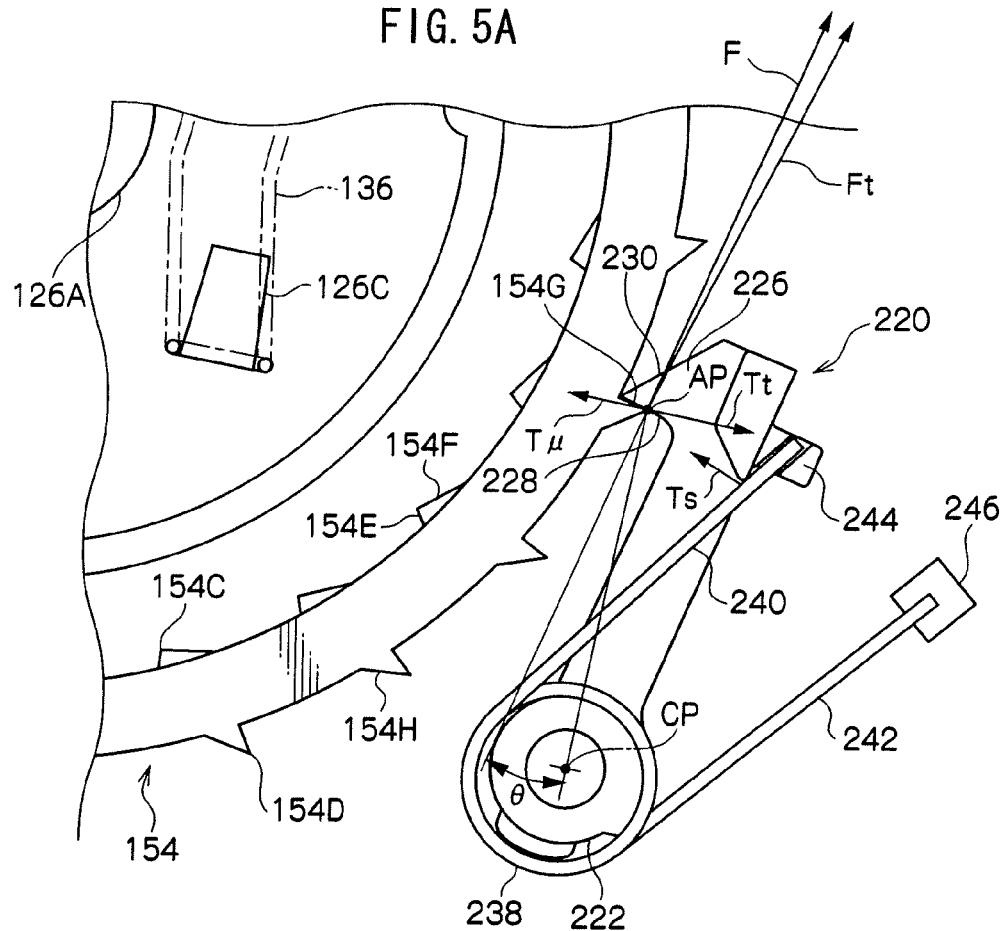
FIG. 5A is a plan view showing an engaged state of the gear ring and a release pawl in the webbing retractor shown in FIG. 1.
Figure 5B:
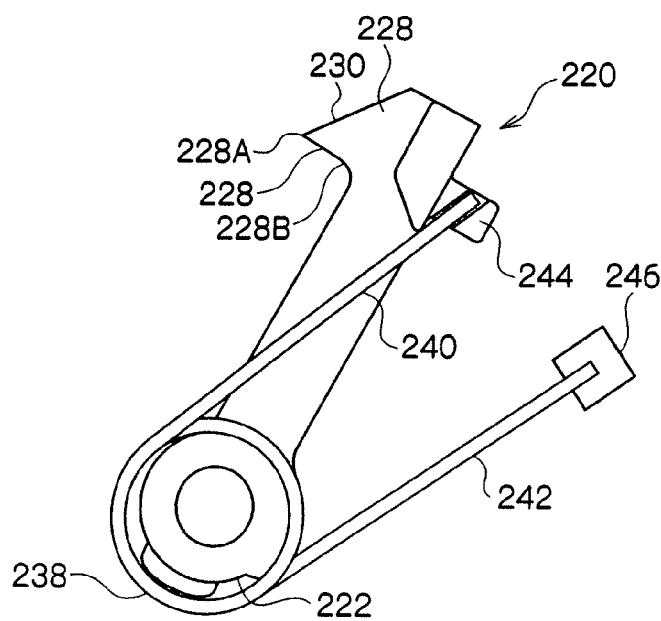
FIG. 5B is a plan view showing, in an enlarged manner, the release pawl in the webbing retractor shown in FIG. 1.

As shown in FIG. 5A and FIG. 5B, the coil portion 238 of the torsion coil spring 236 is fit-on the outer peripheral side of the shaft-receiving portion 222. The distal end portion of the one arm portion 240 is anchored by an anchor portion 244 provided at the distal end side of the release pawl 220. The distal end portion of the other arm portion 242 is anchored by an anchor portion 246 provided at the outer peripheral side of the connecting shaft 224 at the sensor gear 128. The release pawl 220 is thereby always urged toward the restraining position by the urging force of the torsion coil spring 236.

The release pawl 220 which is at the restraining position causes the anchor claw 226 to engage with one of the external teeth 154D of the gear ring 154, and causes the tooth surface 228 of the anchor claw 226 to abut the tooth surface 154G of the external tooth 154D. The sensor gear 128 is thereby connected to the gear ring 154 via the release pawl 220. At this time, when the gear ring 154 rotates in the pull-out direction relative to the sensor gear 128, torque in the pull-out direction is transmitted from the V-gear 126 to the sensor gear 128, and the V-gear 126, the gear ring 154 and the sensor gear 128 rotate integrally in the pull-out direction.

In contrast, when the V-gear 126 rotates in the take-up direction relative to the sensor gear 128, the inclined surface 230 of the anchor claw 226 abuts the inclined surface 154H of the external tooth 154D, and these inclined surfaces 230, 154H slide along one another, and the release pawl 220 moves toward the outer peripheral side against the urging force of the torsion coil spring 236. The anchor claw 226 thereby rides over the external tooth 154D. In this way, torque in the take-up direction is not transmitted from the V-gear 126 to the sensor gear 128, and only the V-gear 126 rotates (rotates idly) in the take-up direction with respect to the sensor gear 128.

As shown in FIG. 5A and FIG. 5B, in the state in which the anchor claw 226 of the release pawl 220 which is at the restraining position engages with one of the external teeth 154D of the gear ring 154, when torque in the pull-out direction is transmitted from the V-gear 126 to the gear ring 154, the tooth surface 154G of the external tooth 154D press-contacts the tooth surface 228 of the anchor claw 226 at a press-contact force (load) that corresponds to the torque in the pull-out direction. At this time, the tooth surface 154G of the external tooth 154D and the tooth surface 228 of the anchor claw 226 are not in a state of being parallel to one another in theory (in terms of design), and, as shown in FIG. 5A and FIG. 5B, the tooth surface 154G is inclined slightly with respect to the tooth surface 228. Due thereto, the outer peripheral side end portion (the distal end portion) of the tooth surface 154G press-contacts an intermediate portion between the distal end portion 228A and a proximal end portion 228B (see FIG. 5B) at the tooth surface 228 which is at the restraining position.

Here, the press-contact region of the tooth surface 154G and the tooth surface 228 is AP, and the angle of intersection between the normal line of the tooth surface 228 at the press-contact region AP, and the straight line which connects the press-contact region AP and a rotational center CP of the release pawl 220, is θ. Further, in FIG. 5A and FIG. 5B, the load (transmitted load) applied to the tooth surface 228 from the tooth surface 154G at the press-contact region AP is denoted by F, the component of force of the transmitted load F along the normal direction of the press-contact region AP at the tooth surfaces 154G, 228 is denoted by Ft, the torque which is generated due to frictional force between the tooth surfaces 154G, 228 at the press-contact region AP and is applied to the release pawl 220 as rotational force in the counterclockwise direction is denoted by Tμ, the torque which is generated by the component of force Ft and is applied to the release pawl 220 at the press-contact region AP as rotational force in the clockwise direction is denoted by Tt, and the torque which is generated due to the urging force of the torsion coil spring 236 and is applied to the release pawl 220 as rotational force in the counterclockwise direction is denoted by Ts.

As is clear from FIG. 5A and FIG. 5B, when considering the transmitted load F to be constant, the clockwise direction torque Tt, which is generated by the component of force Ft, increases as the angle of intersection θ increases.

At this time, if Tμ, Ts and Tt have the relationship of following formula (1), the anchor claw 226 of the release pawl 220 is stably maintained in the state of engaging with the external tooth 154D of the gear ring 154, i.e., the release pawl 220 is stably maintained at the restraining position, and torque in the pull-out direction can be transmitted from the V-gear 126 to the gear ring 154.

$$T\mu + Ts > Tt \quad (1)$$

On the other hand, if Tμ, Ts and Tt have the relationship of following formula (2), the anchor claw 226 which is engaged with the external tooth 154D rotates clockwise from the restraining position against the torques Tμ, Ts and due to the torque Tt. In this way, after the release pawl 220 is rotated once to the position at which the anchor claw 226 is separated from the external tooth 154D (the restraint cancelled position), the release pawl 220 returns to the restraining position due to the urging force of the torsion coil spring 236 (the torque Ts).

$$T\mu + Ts < Tt \quad (2)$$

(Operation of Exemplary Embodiment, Operation at Usual Times)

Next, operation of the webbing retractor 10 relating to the present exemplary embodiment will be described. At the webbing retractor 10, when the distal end side of the webbing belt 30, which is in a state of being taken-up on the spool 24, is pulled against the urging force of the spiral spring 40, the spool 24 rotates in the pull-out direction as the webbing belt 30 is pulled-out toward the outer peripheral side. The webbing belt 30, which is pulled-out in this way, is placed around the body of a vehicle occupant, and is set in a state of being applied to the body of the vehicle occupant by, for example, a tongue plate, which is provided at the longitudinal direction intermediate portion of the webbing belt 30, being made to be held in a buckle device which is provided at the side of a vehicle seat, such that the body of the vehicle occupant is restrained by the webbing belt 30.

At the webbing retractor 10, in the state in which the webbing belt 30 is applied to the vehicle occupant, the vehicle enters into a state of rapid deceleration, and the vehicle sensor 142 thereby operates and engages with the V-pawl 140 of the sensor gear 128 and rotates the V-pawl 140 so as to push the V-pawl 140 upward. The V-pawl 140 thereby meshes with the V-gear 126.

On the other hand, when the body of the vehicle occupant moves substantially toward the front side of the vehicle due to inertia at the time when the vehicle decelerates, the webbing belt 30 is suddenly pulled by the body of the vehicle occupant. Due to the webbing belt 30 being pulled suddenly in this way, rotational force in the pull-out direction is suddenly applied to the spool 24.

Basically, when the torsion shaft 36 and the V-gear 126 rotate in the pull-out direction due to the spool 24 rotating in the pull-out direction, the inertial body 138, which is held at the non-operating position (see FIG. 3A) by the sensor spring 136 at the webbing sensor mechanism 133, rotates together with the V-gear 126 in the pull-out direction. However, in a case in which the spool 24 rotates suddenly in the pull-out direction as described above, the inertial body 138 attempts, due to inertia, to remain at that position without rotating. In this way, the inertial body 138 rotates around the connecting shaft 126B toward the operating position (see FIG. 4A) relative to the V-gear 126 against the urging force of the sensor spring 136. When the inertial body 138 rotates to the operating position, the W-pawl 134 rotates from the connection released position (see FIG. 3A) to the connected position (see FIG. 4A) due to the inertial body 138, and the anchor claw 134A of the W-pawl 134 meshes with the internal tooth 154C of the gear ring 154.

At this time, the release pawl 220 is held at the restraining position by the torsion coil spring 236, and is engaged with the external tooth 154D of the gear ring 154. In this way, the gear ring 154 is connected via the release pawl 220 so as to rotate integrally with the sensor gear 128 in the pull-out direction. Accordingly, due to the W-pawl 134 engaging with the internal tooth 154C of the gear ring 154, the rotational force of the spool 24 in the pull-out direction is transmitted to the gear ring 154 via the torsion shaft 36, the V-gear 126 and the W-pawl 134, and the gear ring 154 rotates integrally with the V-gear 126 in the pull-out direction.

Due to the gear ring 154 rotating in the pull-out direction, the rotational force of the gear ring 154 is transmitted to the sensor gear 128 via the release pawl 220. The sensor gear 128, which was at the separated position, rotates in the pull-out direction.

When the sensor gear 128 rotates by a given angle in the pull-out direction against the urging force of the return spring 132 and reaches a pushing position, the pushing portion 168 provided at the sensor gear 128 pushes the pawl portion 166 of the lock pawl 160 and rotates the pawl portion 166 around the shafts 162.

When the pawl portion 166 rotates around the shafts 162 in this way, the pawl portion 166 engages with the ratchet portion 172 of the ratchet member 170, and restricts rotation of the ratchet member 170 and the spool 24 in the pull-out direction. In this way, the body of the vehicle occupant, which is attempting to inertially move substantially toward the front side of the vehicle, can be reliably restrained and held by the webbing belt 30.

Note that, when the sensor gear 128 reaches the pushing position, rotation of the sensor gear 128 in the pull-out direction is restrained due to the lock pawl 160 engaging with the ratchet portion 172. Therefore, the rotational force in the pull-out direction, which is transmitted from the gear ring 154 to the sensor gear 128 via the release pawl 220, sharply increases. Due thereto, the transmitted load F, which is applied from the tooth surface 154G to the tooth surface 228 at the press-contact region AP (see FIG. 5A and FIG. 5B) also increases sharply. In accordance with the increase in the transmitted load F, the torque Tt, which is applied to the release pawl 220 as rotational force in the clockwise direction, increases.

As a result, when the sensor gear 128 reaches the pushing position, the torque Tt is greater than the torque Tµ and the torque Ts which act as rotational forces in the counterclockwise direction. The release pawl 220 rotates from the restraining position to the restraint cancelled position by the torque Tt against the torques Tt, Ts. The gear ring 154 becomes able to rotate in the pull-out direction while the sensor gear 128 remains held at the pushing position.

(Operation of Exemplary Embodiment, Operation when Phase Offset Arises)

At the webbing retractor 10, at the time when a vehicle occupant pulls-out the webbing belt 30 which is taken-up on the spool 24, if the spool 24 rotates at a speed which is higher than a speed supposed in advance, phase offset (a phase difference) arises at the portions between the spool 24 and the gear ring 154 (specifically, the spool 24, the torsion shaft 36, the ratchet member 170, the V-gear 126 and the gear ring 154).

Figure 4B:
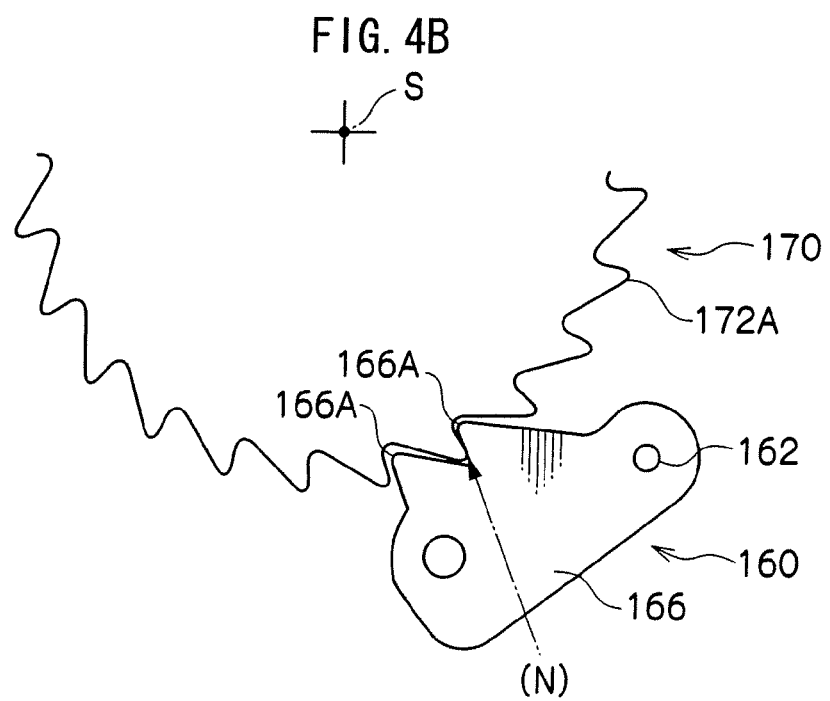
FIG. 4B is a plan view showing the structures of the ratchet member and the lock pawl in the webbing retractor shown in FIG. 1, and FIG. 4A and FIG. 4B show a state in which the W-pawl disposed at the V-gear is at a connected position.

As a result, given that the number corresponding to the phases of the internal tooth 154C of the gear ring 154 and the ratchet tooth 172A of the ratchet member 170 is N (N is a natural number which is greater than or equal to 1 and less than or equal to 24, and is applied in ascending order along the pull-out direction), if the phase difference between the spool 24 and the gear ring 154 exceeds a permitted phase difference, the W-pawl 134 engages with the (N−1)st internal tooth 154C at the gear ring 154, regardless of the fact that the lock pawl 160 is engaged with the Nth ratchet tooth 172A at the ratchet member 170 as shown in FIG. 4B.

Due thereto, the restoring force at the portions between the spool 24 and the ratchet member 170 is applied between the W-pawl 134 and the internal tooth 154C and between the release pawl 220 and the external tooth 154D. At this time, the transmitted load F (see FIG. 5A and FIG. 5B), which is applied between the tooth surface 228 of the release pawl 220 and the external tooth 154D of the gear ring 154, is greater than in a case in which the lock pawl 160 engages with the Nth ratchet tooth 172A and the W-pawl 134 engages with the Nth internal tooth 154C.

At the webbing retractor 10, the magnitude of the angle of intersection θ (see FIG. 5A and FIG. 5B) between the tooth surface 228 of the release pawl 220 and the tooth surface 154G of the external tooth 154D is set such that the condition of following formula (1) is satisfied in a case in which the lock pawl 160 engages with the Nth ratchet tooth 172A and the W-pawl 134 engages with the Nth internal tooth 154C, and the condition of following formula (2) is satisfied in a case in which the lock pawl 160 engages with the Nth ratchet tooth 172A and the W-pawl 134 engages with the (N−1)st internal tooth 154C.

$$Tµ+Ts>Tt \quad (1)$$

$$Tµ+Ts<Tt \quad (2)$$

At the webbing retractor 10, at the time when the lock pawl 160 engages with the ratchet tooth 172A of the ratchet member 170 interlockingly with the sudden pulling-out of the webbing belt 30, when the lock pawl 160 engages with the Nth ratchet tooth 172A and the W-pawl 134 engages with the (N−1)st internal tooth 154C and the transmitted load F is applied between the anchor claw 226 of the release pawl 220 and the external tooth 154D of the gear ring 154, the release pawl 220 is moved from the restraining position to the restraint cancelled position against the urging force of the torsion coil spring 236 due to the torque Tt which the tooth surfaces 154Q 228 generate. When the gear ring 154 rotates due to restoring force to the position at which the phase difference with the ratchet member 170 substantially disappears, the release pawl 220 is returned to the restraining position by the urging force of the torsion coil spring 236.

In this way, in a case in which the lock pawl 160 engages with the Nth ratchet tooth 172A and the W-pawl 134 engages with the (N−1)st internal tooth 154C, the release pawl 220 is immediately moved apart once from the external tooth 154D, the engagement between the W-pawl 134 which is at the connected position and the internal tooth 154C of the gear ring 154 is cancelled, and the release pawl 220 can be made to engage again with the Nth external tooth 154D at the time when the gear ring 154 rotates to the position where the phase difference substantially disappears.

As a result, in accordance with the webbing retractor 10, even in a case in which a phase difference arises at the portions from the spool 24 to the gear ring 154, and the lock pawl 160 engages with the Nth ratchet tooth 172A and the W-pawl 134 engages with the (N−1)st internal tooth 154C, the restoring force, which accompanies the occurrence of the phase difference and which was applied as well between the W-pawl 134 and the internal tooth 154C of the gear ring 154, can also be eliminated.

Second Exemplary Embodiment (Structure of Exemplary Embodiment)

Figure 6:
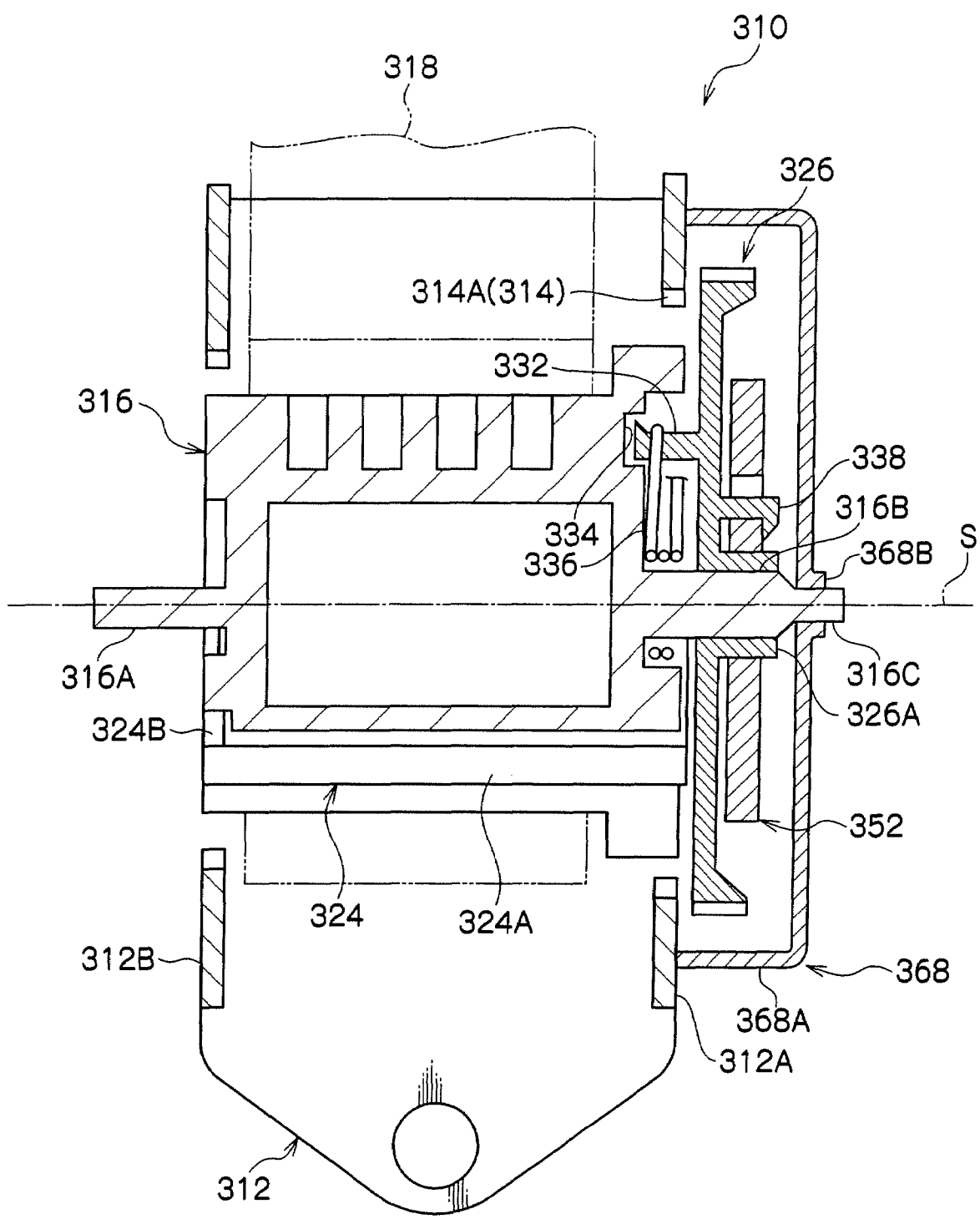
FIG. 6 is a sectional view showing the overall structure of a webbing retractor relating to a second exemplary embodiment of the present invention.
Figure 10:
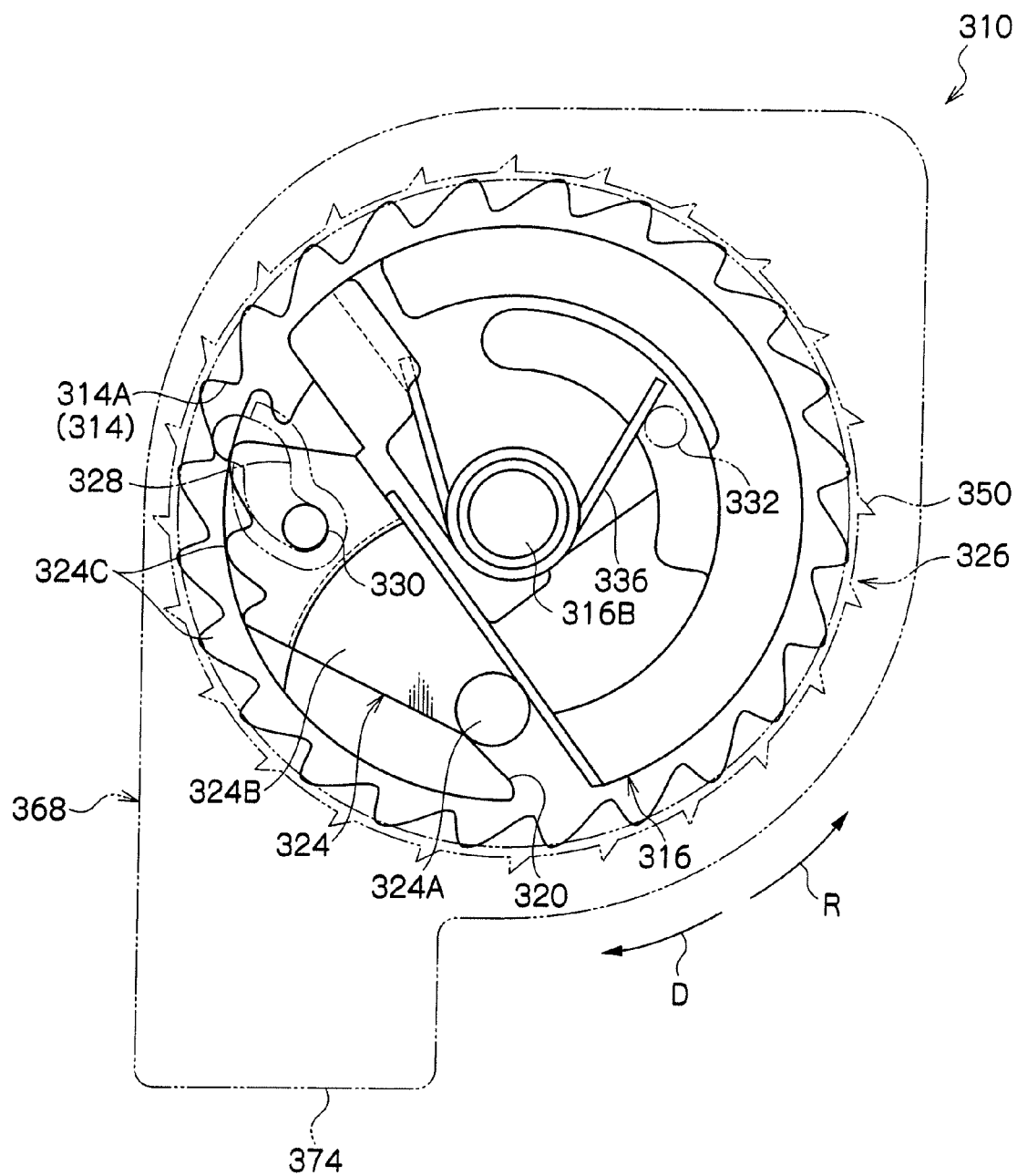
FIG. 10 is a side view showing a locking mechanism (in a non-operating state) in the webbing retractor shown in FIG. 6.

A cross-sectional view of the overall structure of a webbing retractor relating to a second exemplary embodiment of the present invention is shown in FIG. 6. A webbing retractor 310 has a metal frame 312 which is formed in a substantial U-shape as seen in plan view. The frame 312 is fixed to the lower end portion side of a side portion of a vehicle body by the fastening of bolts. Further, as shown in FIG. 10, internal tooth ratchets 314 are formed coaxially in both side portions 312A, 312B of the frame 312 by punching.

As shown in FIG. 6, a spool 316 which is shaped as a cylindrical tube is pivotally-supported at the both side portions 312A, 312B of the frame 312. A rotating shaft 316A is formed integrally with one axial direction end portion at the axially central portion of the spool 316. The inner end of an unillustrated spiral spring is anchored on the rotating shaft 316A. The spool 316 is thereby usually urged to rotate in the take-up direction (the direction of arrow R in FIG. 8).

On the other hand, a rotating shaft 316B is formed integrally with the axial direction other end portion of the spool 316, coaxially with the rotating shaft 316A. A small diameter shaft 316C is formed coaxially at the distal end of the rotating shaft 316B. The spool 316 is supported, at the small diameter shaft 316C, so as to rotate freely at a shaft-receiving portion 368B which is formed at a sensor holder 368 which will be described later. Further, the proximal end portion of a webbing belt 318 for restraining a vehicle occupant is anchored on the spool 316. The webbing belt 318 is freely taken-up and pulled-out by rotation of the spool 316.

Figure 7:
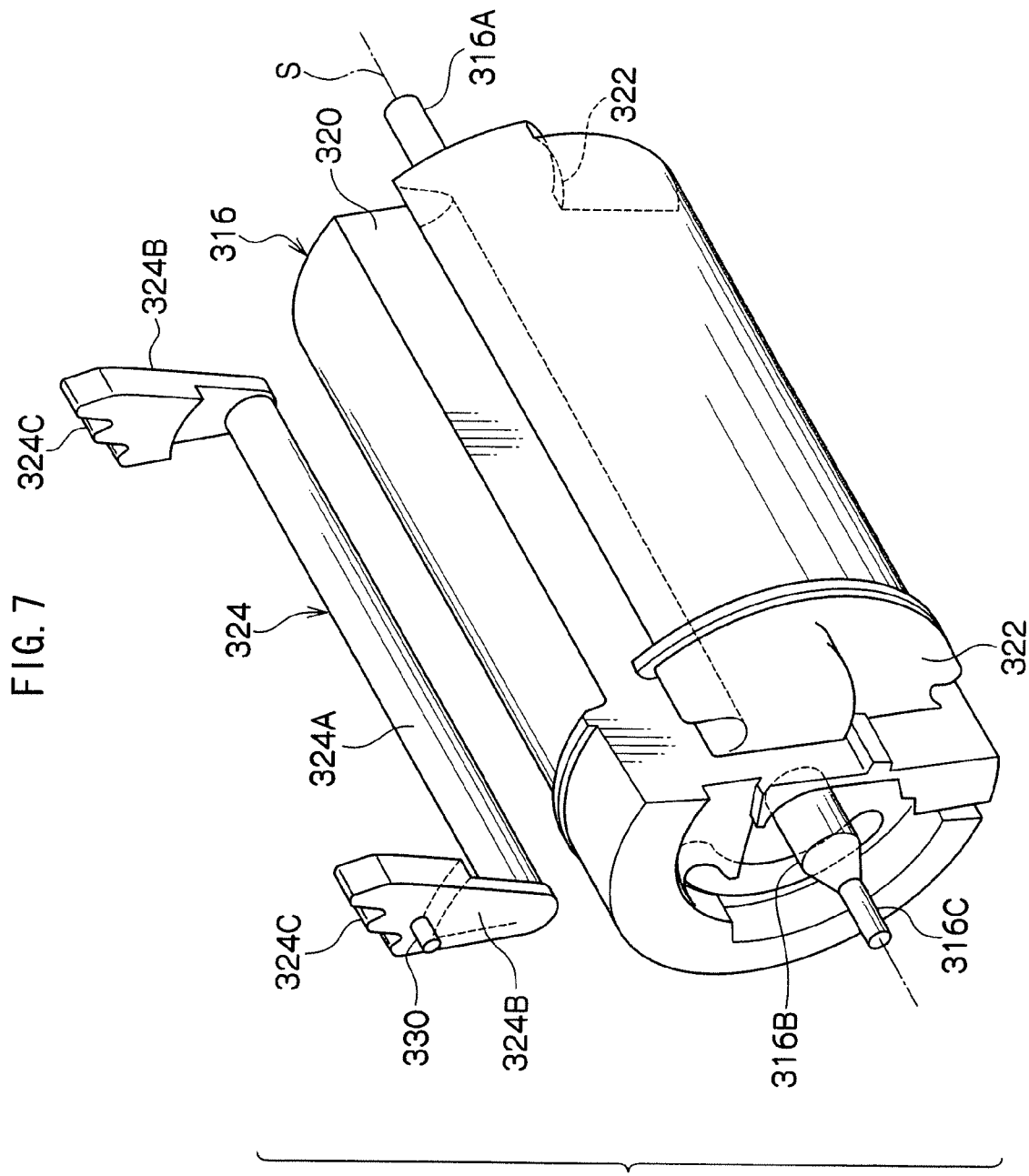
FIG. 7 is a perspective view showing, in a separated manner, a spool and a lock plate shown in FIG. 6.

As shown in FIG. 7, a cut-out portion 320 is formed in the outer peripheral portion of the spool 316 along the axial direction. The cut-out portion 320 is formed along the axial direction over the entire length of the spool 316 other than the rotating shafts 316A, 316B and the small diameter shaft 316C. The floor portion of the cut-out portion 320 is formed in the shape of a semicircular arcuate surface. Further, a pair of concave portions 322 are formed in the axial direction both end portions of the spool 316.

A lock pawl 324, which is substantially U-shaped in plan view and structures a portion of the locking mechanism relating to the present invention, is accommodated in the cut-out portion 320 and the concave portions 322 of the spool 316. The lock pawl 324 is structured by a rod-shaped connecting shaft 324A, and a pair of plates 324B which are formed integrally with the both axial direction end portions of the connecting shaft 324A and extend-out toward the radial direction outer side in parallel to one another. The connecting shaft 324A of the lock pawl 324 is accommodated at the floor portion of the cut-out portion 320 of the spool 316 so as to be able to rotate around the axis. The pair of plates 324B are accommodated (housed) in the pair of concave portions 322 which are formed at the both axial direction end portions of the spool 316. Lock teeth 324C, which can engage with ratchet teeth 314A of the internal tooth ratchets 314 which structure a portion of the locking mechanism relating to the present invention, are formed at the distal end portions of the plates 324B respectively.

Here, the ratchet teeth 314A and the lock pawl 324 structure at least portions of the locking mechanism relating to the present invention.

Figure 11:
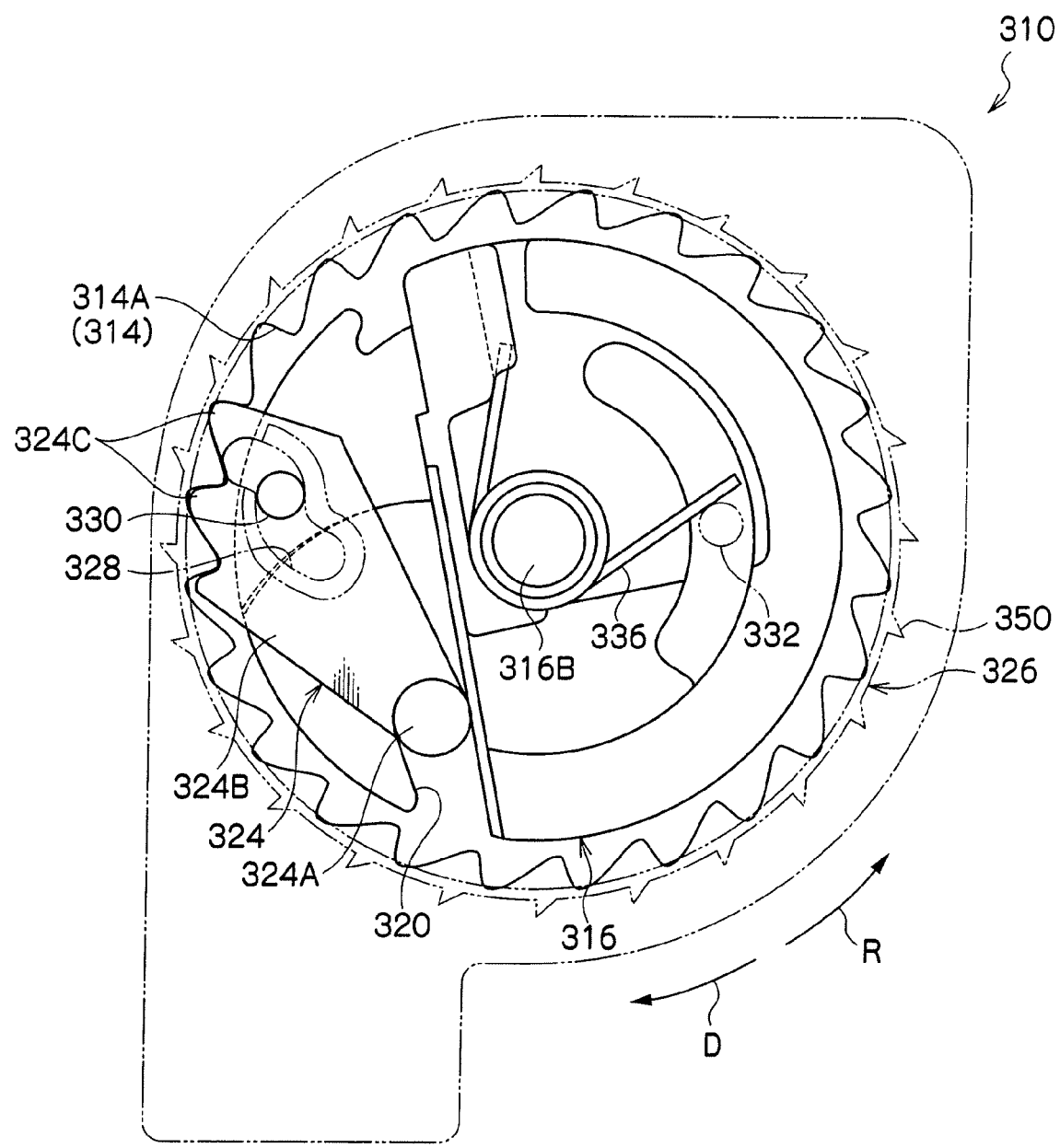
FIG. 11 is a side view showing the locking mechanism (in an operating state) in the webbing retractor shown in FIG. 6.

In the state in which the pair of plates 324B are completely accommodated in the pair of concave portions 322, the lock teeth 324C are held at positions of being separated from the ratchet teeth 314A. This position is the "non-engaged position" of the lock pawl 324 (see FIG. 10). On the other hand, due to the connecting shaft 324A of the lock pawl 324 swinging around the floor portion of the cut-out portion 320 and the pair of plates 324B coming-out from the pair of concave portions 322, the lock teeth 324C engage with the ratchet teeth 314A. Note that this position is the "engaged position" of the lock pawl 324 (see FIG. 11).

As shown in FIG. 6, a V-gear 326 which is a first rotating body is disposed at the outer side of the one side portion 312A of the frame 312. The V-gear 326 is made of resin, and is formed substantially in the shape of a disc having a larger diameter than the outer diameter of the end portion of the spool 316. A boss 326A, which is shaped as a cylindrical tube and has a pair of resin claws at the inner peripheral surface thereof, is formed at the axially central portion of the V-gear 326. Due to the rotating shaft 316B of the spool 316 being inserted in the boss 326A, the V-gear 326 is mounted to one axial direction end portion of the spool 316 so as to be coaxial therewith and so as to rotate freely.

As shown in FIG. 10, a substantially backward S-shaped guide hole 328 is formed at a predetermined position of the outer peripheral side of the V-gear 326. A guide pin 330, which stands erect from the one plate 324B of the lock pawl 324, is inserted in the guide hole 328. The V-gear 326 is thereby able to rotate relative to the spool 316 within a predetermined range of angles of rotation. When relative rotation occurs between the both, the guide hole 328 moves the guide pin 330 from the inner side toward the outer side, and guides the lock teeth 324C of the lock pawl 324 to positions at which they can engage with the ratchet teeth 314A of the internal tooth ratchets 314 of the frame 312.

As shown in FIG. 6 and FIG. 10, a supporting projection 332 stands erect at the spool 316 side surface of the V-gear 326, in the direction opposite the boss 326A. The distal end portion of the supporting projection 332 is inserted in a concave portion 334 formed at one axial direction end portion of the spool 316. In this state, one end portion of a torsion coil spring 336 is anchored on the supporting projection 332. The coil portion of the torsion coil spring 336 is disposed in a state of being wound on the rotating shaft 316B of the spool 316. The other end portion of the torsion coil spring 336 is anchored on one axial direction end portion of the spool 316. In this way, the V-gear 326 usually rotates following the spool 316.

Figure 9:
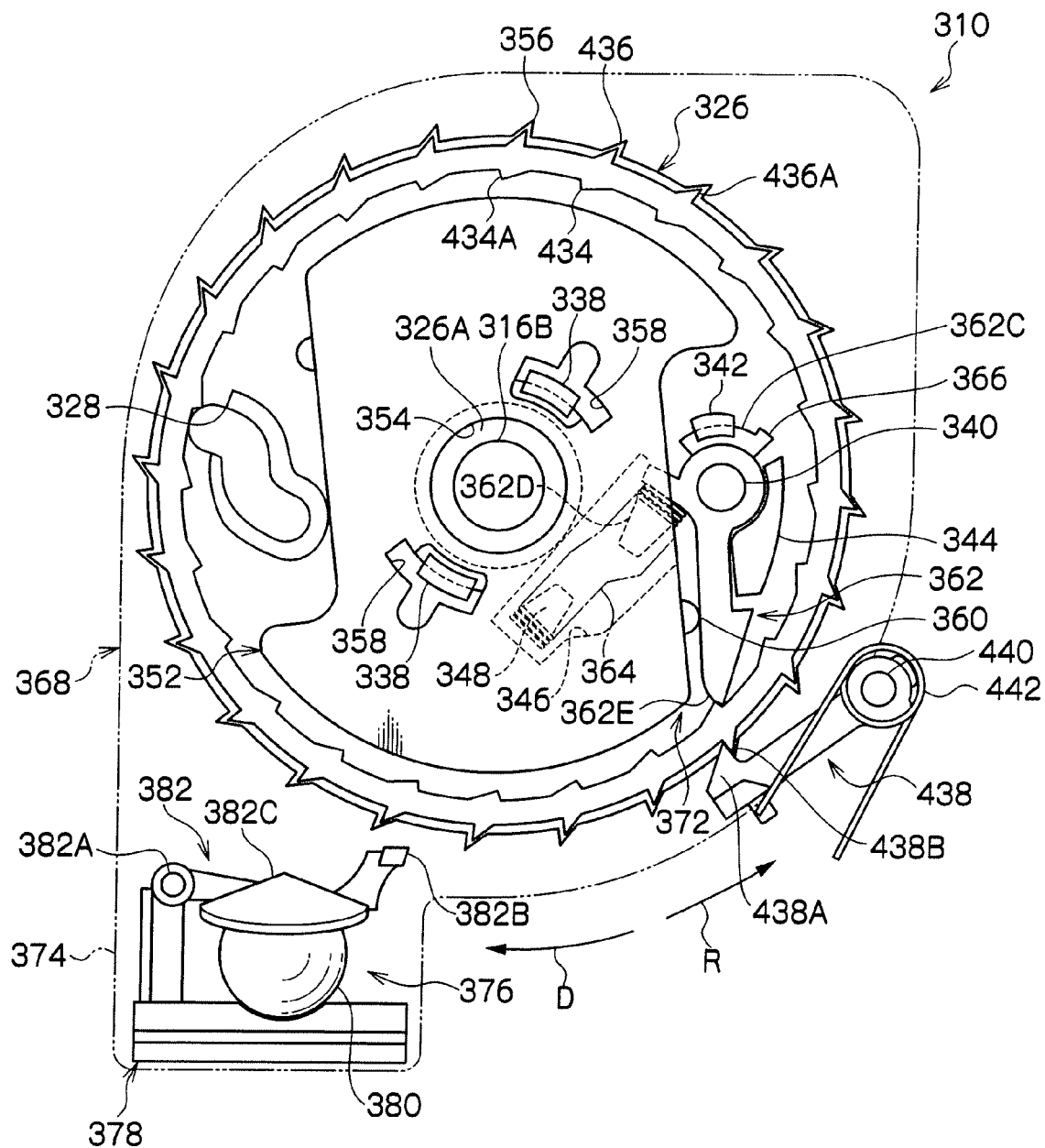
FIG. 9 is a side view showing the W-sensor (in an operating state) and the V-sensor in the webbing retractor shown in FIG. 6.

As shown in FIG. 9, a pair of anchor portions 338 are formed to stand parallel to the boss 326A at the periphery of the boss 326A of the V-gear 326. The anchor portions 338 are formed in the shapes of circular arcs which are coaxial with the boss 326A in plan view, and are formed at two places which are symmetrical across the boss 326A. Further, a pawl shaft 340, which is shaped as a solid cylinder having a small diameter, stands erect at that same side surface of the V-gear 326. The pawl shaft 340 is formed at a position which is substantially symmetrical to the guide hole 328 across the boss 326A, and is a portion which is the pivot of a W-pawl 362 which will be described later.

Figure 8:
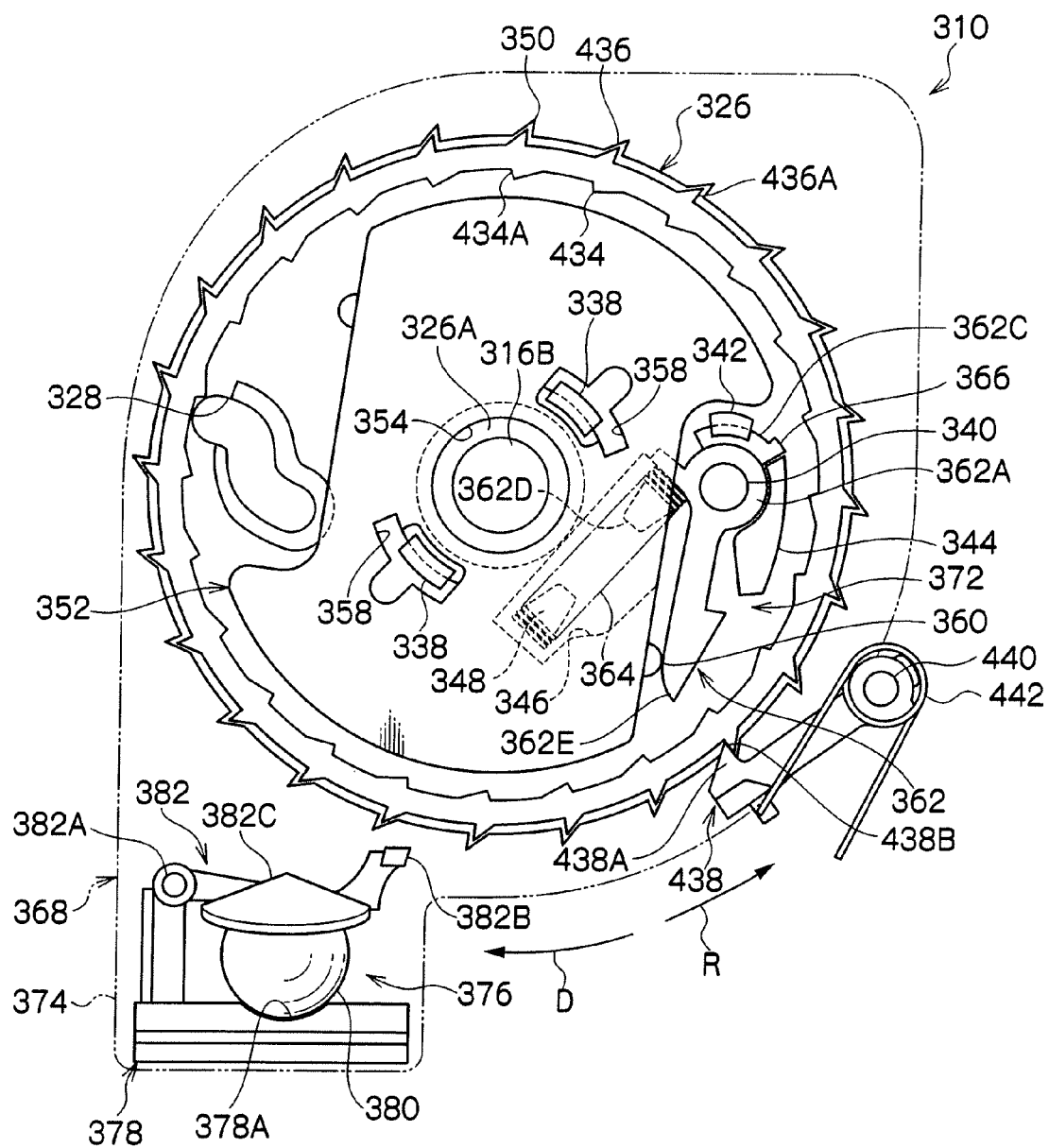
FIG. 8 is a side view showing a W-sensor (in a non-operating state) and a V-sensor in the webbing retractor shown in FIG. 6.

As shown in FIG. 8, a pawl anchor portion 342, which is formed in the shape of a circular arc concentric with the pawl shaft 340 and at whose distal end portion a resin claw is formed, is formed integrally in a vicinity of the pawl shaft 340. A pawl stopper 344, which corresponds to the shape of the W-pawl 362, is formed integrally in a vicinity of the pawl shaft 340. A spring hole 346 shaped as a long hole is formed in the V-gear 326 in a vicinity of the pawl shaft 340. A spring receiving portion 348, which is shaped as a substantially solid-cylindrical projection, is formed integrally with one end portion of the spring hole 346.

Plural (24 in the present exemplary embodiment) ratchet teeth 350, which can be engaged by an engaging portion 382B of a sensor lever 382 of a vehicle sensor 376 which will be described later, are formed integrally with the outer peripheral surface of the V-gear 326. The ratchet teeth 350 are arrayed at a uniform pitch (a 15° pitch) at the outer peripheral surface of the V-gear 326 along the peripheral direction which is centered around the axial center S.

As shown in FIG. 6 and FIG. 8, an inertial body 352 is disposed coaxially at the axial direction outer side of the V-gear 326. The inertial body 352 is formed substantially in the shape of a disc at which two places of the outer periphery are cut-out. A shaft-supporting hole 354 is formed in the axially central portion of the inertial body 352. A pair of circular-arc-shaped anchor holes 358 are formed at opposing positions in the radial direction, at the outer side of the shaft-supporting hole 354. The boss 326A of the V-gear 326 is inserted in the shaft-supporting hole 354, and the pair of anchor portions 338 of the V-gear 326 are inserted in the pair of anchor holes 358. In this way, the pair of anchor portions 338 are anchored elastically, and the inertial body 352 is mounted coaxially and integrally to the V-gear 326.

Here, the length (arc length) of the anchor hole 358 along the peripheral direction is set to be longer than the length (arc length) of the anchor portion 338 along the peripheral direction. In the state after mounting, the inertial body 352 can rotate in the take-up direction relative to the V-gear 326 within the range of the difference of the arc lengths (the circumferential angle). Further, engaging projections 360 are formed integrally with the end surfaces of the cut-out sides of the inertial body 352.

The W-pawl 362 is swingably supported at the pawl shaft 340 of the V-gear 326. The W-pawl 362 is structured by a pivot portion 362A which is shaped as a cylindrical tube and is pivotally-supported at the pawl shaft 340, an arm portion 362B which extends from the pivot portion 362A and at whose distal end side surface a claw is formed, an anchor piece 362C formed at the outer periphery of the lower portion of the pivot portion 362A, and a spring receiving portion 362D which extends-out from the pivot side of the bottom edge of the arm portion 362B.

In the state in which the pawl shaft 340 is inserted in the pivot portion 362A, the anchor piece 362C is anchored at the pawl anchor portion 342 of the V-gear 326 such that the W-pawl 362 is prevented from coming-off in the axial direction. Further, one end portion of a coil spring 364 which is in a compressed state is fit in and anchored on the spring receiving portion 362D. The other end portion of the coil spring 364 is fit in and anchored on the aforementioned spring receiving portion 348 of the V-gear 326. The coil spring 364 is, in a compressed state, accommodated within the spring hole 346 formed in the V-gear 326. Due thereto, the W-pawl 362 is urged to rotate in the clockwise direction around the pawl shaft 340 due to the urging force of the coil spring 364.

Here, the W-pawl 362, the vehicle sensor 376, the inertial body 352, and the coil spring 364 structure at least portions of the rotation controlling mechanism relating to the present invention.

A small projection 366, which can abut the pawl stopper 344 formed at the V-gear 326, is formed integrally with the end portion of the anchor piece 362C of the W-pawl 362. The small projection 366 is a stopper at the time when the W-pawl 362 rotates in the clockwise direction around the pawl shaft 340 due to the urging force of the coil spring 364. In this way, the W-pawl 362 usually rotates integrally with the V-gear 362 (revolves around the rotating shaft 316B) without swinging.

On the other hand, when the W-pawl 362 rotates counterclockwise around the pawl shaft 340 against the urging force of the coil spring 364, the arm portion 362B abuts the side surface of the pawl stopper 344 and impedes further swinging. The range over which the W-pawl 362 can swing (the angle of rotation) is thereby restricted. Specifically, the W-pawl 362 can swing between a connection released position (see FIG. 8) and a connected position (see FIG. 9).

As shown in FIG. 6, the sensor holder 368, which is made of resin and is formed in the shape of a flat cup, is mounted to the outer side of the one side portion 312A of the frame 312. A gear ring 432 which will be described later is disposed at the inner side of the sensor holder 368. In the state in which the sensor holder 368 is mounted, the distal end portion of the arm portion 362B of the W-pawl 362 opposes internal teeth 434 formed at the inner peripheral surface of the gear ring 432. In a case in which the W-pawl 362 swings around the pawl shaft 340 due to the inertial body 352 and against the urging force of the coil spring 364 at the time when the webbing belt 318 is suddenly pulled-out, the distal end portion of the arm portion 362B of the W-pawl 362 engages with the internal tooth 434.

Note that, in the above-described structure, the inertial body 352 and the coil spring 364 structure a webbing sensor which holds the W-pawl 362 at the connection released position when the spool 316 is rotating in the pull-out direction at an angular acceleration which is less than or equal to a predetermined steady-state value, and which move the W-pawl 362 to the connected position when the angular acceleration of the spool 316 exceeds the steady-state value.

As shown in FIG. 8, a holder portion 374, which is substantially parallelepiped and is hollow, is formed integrally with the lower end portion of the outer periphery of the sensor holder 368. The vehicle sensor 376 is accommodated in the holder portion 374. When a predetermined deceleration acts on the vehicle, the vehicle sensor 376 senses this deceleration, and pushes a sensor lever 382 upward such that the sensor lever 382 engages with the ratchet tooth 350 of the V-gear 326.

The gear ring 432 and a release pawl 438 of the webbing retractor 310 relating to the present exemplary embodiment will be described next by using FIG. 8 and FIG. 9.

As shown in these figures, the gear ring 432 which is a second rotating body is disposed at the outer peripheral side of the inertial body 352. The gear ring 432 is not formed integrally with the sensor holder 368, and is disposed rotatably at the inner side of the sensor holder 368, separately and independently from the sensor holder 368. The internal teeth 434, with which the distal end portion of the arm portion 362B of the W-pawl 362 can engage, are formed at the inner peripheral surface of the gear ring 432. External teeth 436 are formed at the outer peripheral surface of the gear ring 432. Here, the same number (24 in the present exemplary embodiment) of internal teeth 434 and external teeth 436 as the number of ratchet teeth 314A at the frame 312 are formed at the gear ring 432. The internal teeth 434 and external teeth 436 are arrayed at a uniform pitch (a 15° pitch) at the inner peripheral surface and outer peripheral surface of the gear ring 432 along the peripheral direction which is centered around the axial center S.

The release pawl 438, at whose distal end portion an anchor claw 438A is formed, is pivotally-supported at the outer peripheral side of the gear ring 432 so as to be able to swing around a pivot 440. The release pawl 438 which is the pawl relating to the present invention can swing between a restraining position, at which the anchor claw 438A is engaged with the external tooth 436 of the gear ring 432, and a restraint cancelled position, at which the anchor claw 438A is separated from the external teeth 436. The release pawl 438 is always urged toward the restraining position by the urging force of a torsion coil spring 442 which is an urging member. Accordingly, usually, the anchor claw 438A of the release pawl 438 is engaged with the external tooth 436 of the gear ring 432 due to the urging force of the torsion coil spring 442. Rotation of the gear ring 432 in the pull-out direction is thereby restrained.

Here, the gear ring 432, the release pawl 438 and the torsion coil spring 442 structure at least portions of the phase difference adjusting mechanism relating to the present invention.

As shown in FIG. 9, a tooth surface 362E, which abuts a tooth surface 434A of the internal tooth 434 in the state in which the W-pawl 362 is engaged with the internal tooth 434 of the gear ring 432, is formed at the distal end portion of the W-pawl 362. Here, the angles of inclination of the tooth surface 362E of the W-pawl 362 and the tooth surfaces 434A of the internal teeth 434 with respect to the direction tangent to the pitch circle of the internal teeth 434 are respectively set such that the tooth surface 362E of the W-pawl 362 and the tooth surface 434A of the internal tooth 434 together form a rake angle. In this way, when torque in the pull-out direction is transmitted from the V-gear 326 to the gear ring 432, the component of force (torque) which is directed toward the axial center S acts on the W-pawl 362, and, due to this torque, the W-pawl 362 is reliably maintained in the state of engaging with the internal tooth 434.

Further, a tooth surface 438B, which abuts a tooth surface 436A of the external tooth 436 in the state in which the release pawl 438 is engaged with the external tooth 436 of the gear ring 432, is formed at the release pawl 438 at the proximal end side of the anchor claw 438A. Here, when the release pawl 438 and the external tooth 436 are engaged, the distal end portion of the tooth surface 438B of the release pawl 438 abuts an intermediate portion between the distal end portion and the proximal end portion at the tooth surface 436A of the external tooth 436. At this time, the region where the tooth surface 436A and the tooth surface 438B press-contact one another is press-contact region AP, and the angle of intersection between the normal line of the tooth surface 438B at the press-contact region AP, and the straight line which connects the press-contact region AP and the rotational center of the release pawl 438, is θ.

At the webbing retractor 310, in the same way as in the case of the webbing retractor 10 relating to the first exemplary embodiment (see FIG. 5A and FIG. 5B), by setting the magnitude of the angle of intersection θ appropriately, the component of force Ft of the transmitted load F arises along the normal direction of the press-contact region AP at the tooth surfaces 436A, 438B, and the torque Tt, which acts as rotational force in the counterclockwise direction on the release pawl 438, is generated by this component of force Ft.

The torque Tμ in the clockwise direction, which is generated by the frictional force between the tooth surfaces 436A, 438B at the press-contact region AP, and the torque Ts in the clockwise direction, which is generated by the urging force of the torsion coil spring 442, respectively act on the release pawl 438. Note that the angle of intersection θ, the press-contact region AP, the transmitted load F, the component of force Ft, the torque Tt, the torque Tμ, and the torque Ts are the same as in the case of the webbing retractor 10 relating to the first exemplary embodiment which was described by using FIG. 5A and FIG. 5B. Therefore, illustration of these is omitted from the drawings relating to the present exemplary embodiment.

(Operation of Exemplary Embodiment)

Operation of the webbing retractor 310 relating to the second exemplary embodiment of the present invention will be described next.

At the webbing retractor 310, usually, the W-pawl 362 of a W-sensor 372 is urged to rotate clockwise around the pawl shaft 340 by the urging force of the coil spring 364, and the sensor lever 382 of the vehicle sensor 376 is held beneath the V-gear 326. Therefore, the W-sensor 372 and the vehicle sensor 376 do not operate. Thus, the spool 316 can rotate freely in both the pull-out direction and the take-up direction, in the state in which the lock pawl 324 is accommodated. On the other hand, when the webbing belt 318 is pulled-out suddenly or when the vehicle enters a state of rapid deceleration, the W-sensor 372 and the vehicle sensor 376 operate. Hereinafter, operation of these respective portions will be summarized in that order.

First, a case in which the W-sensor 372 operates will be described. When the webbing belt 318 is pulled-out suddenly, the spool 316 and the V-gear 326 are rotated at high-speed in the pull-out direction (the direction of arrow D). At this time, because the inertial body 352 cannot follow the V-gear 326, an inertial delay arises at the inertial body 352 against the urging force of the coil spring 364, and the inertial body 352 rotates in the take-up direction (the direction of arrow R) relative to the V-gear 326. When the inertial body 352 rotates in the take-up direction relative to the V-gear 326, the W-pawl 362, which is abutted by the engaging projection 360 of the inertial body 352, is pushed and swung in the take-up direction, and engages with the internal tooth 434 of the gear ring 432 which is fixedly held within the sensor holder 368 via the release pawl 438, and rotation of the V-gear 326 in the pull-out direction is impeded (see FIG. 9).

When rotation of the V-gear 326 in the pull-out direction is impeded, successively thereto, relative rotation arises between the V-gear 326 and the spool 316 on which the tensile force of the webbing is acting. The guide pin 330 is guided to the outer end side of the guide hole 328 of the V-gear 326, and the lock teeth 324C of the lock pawl 324 are thereby guided to the positions at which engagement with the ratchet teeth 314A of the internal tooth ratchets 314 is possible. A lock standby state, i.e., a state in which the tooth crests of the lock teeth 324C are engaged with the tooth crests of the ratchet teeth 314A of the internal tooth ratchets 314, arises.

When the tooth crests of the claws of the pair of lock teeth 324C of the lock pawl 324 are guided to the positions at which engagement with the tooth crests of the ratchet teeth 314A of the pair of internal tooth ratchets 314 is possible, accompanying the further rotation of the spool 316 in the pull-out direction, the tooth crests of the lock teeth 324C are guided by the ratchet teeth 314A, and reach the tooth bottoms of the ratchet teeth 314A. In this way, the lock pawl 324 is reliably locked by the internal tooth ratchets 314, rotation of the spool 316 in the pull-out direction is impeded, and further pulling-out of the webbing belt 318 is restricted. Namely, after the lock teeth 324C are guided to the positions where engagement with the internal tooth ratchets 314 is possible, the spool 316 (the lock pawl 324) self-locks.

On the other hand, after pulling-out of the webbing belt 318 is impeded, when the tension acting on the webbing belt 318 decreases and the spool 316 is rotated by a predetermined angle in the take-up direction (the direction of arrow R) (i.e., when a predetermined amount of the webbing belt 318 is taken-up), the state of engagement of the lock pawl 324 and the internal tooth ratchets 314 is cancelled. Namely, when the spool 316 is rotated in the take-up direction, due to the lock pawl 324 being pushed at the connecting shaft 324 by the cut-out portion 320 of the spool 316, the lock teeth 324C move away from the internal tooth ratchets 314 respectively, and the lock pawl 324 is, together with the V-gear 326, returned to the initial position due to the urging force of the torsion coil spring 336. Note that the taking-up of the webbing belt 318 after the decrease in the tension applied to the webbing belt 318, is achieved due to an unillustrated spiral spring which is connected to the rotating shaft 316A of the spool 316.

Next, the case in which the vehicle sensor 376 operates will be described. When the vehicle enters a state of rapid deceleration, the vehicle sensor 376 operates, and the sensor lever 382 engages with the ratchet tooth 350 of the V-gear 326. Because rotation of the V-gear 326 in the webbing pull-out direction is thereby impeded, relative rotation arises between the V-gear 326 and the spool 316. Because the operation thereafter is similar to that in the above-described case of the W-sensor 372, description thereof is omitted.

As a result, given that the number corresponding to the phases of the internal tooth 154C of the gear ring 154 and the ratchet tooth 172A of the ratchet member 170 is N (where N is a natural number which is greater than or equal to 1 and less than or equal to 24, and is applied in ascending order along the pull-out direction), if the phase difference between the spool 24 and the gear ring 154 exceeds a permitted phase difference, the W-pawl 134 engages with the (N−1)st internal tooth 154C at the gear ring 154, regardless of the fact that the lock pawl 160 is engaged with the Nth ratchet tooth 172A at the ratchet member 170 as shown in FIG. 4B.

At the webbing retractor 310, at the time when a vehicle occupant pulls-out the webbing belt 318 which is taken-up on the spool 316, if the spool 316 rotates at a speed which is higher than a speed supposed in advance, a phase difference may arise at the portions between the spool 316 and the gear ring 432 (specifically, the spool 316, the rotating shaft 316B, the V-gear 326 and the gear ring 432).

In such a case, the phenomenon arises in which the phase of the internal tooth 434 with which the W-pawl 362 is engaged is offset, with respect to the phase of the ratchet teeth 314A with which the lock pawl 324 is engaged, by an amount corresponding to one pitch of the internal teeth 434 which are arrayed along the peripheral direction.

As a result, given that the number corresponding to the phases of the internal tooth 434 of the gear ring 432 and the ratchet teeth 314A of the frame 312 is N (N is a natural number which is greater than or equal to 1 and less than or equal to 24, and is applied in ascending order along the pull-out direction), if the phase difference between the spool 316 and the gear ring 432 exceeds a permitted phase difference, the W-pawl 362 engages with the (N−1)st internal tooth 434 at the gear ring 432, regardless of the fact that the lock pawl 324 is engaged with the Nth ratchet teeth 314A at the frame 312.

In this way, restoring force, which accompanies the occurrence of the phase difference at the portions between the spool 316 and the gear ring 432, is applied between the W-pawl 362 and the internal tooth 434 and between the release pawl 438 and the external tooth 436. At this time, the transmitted load F, which is applied between the tooth surface 438B of the release pawl 438 and the external tooth 436 of the gear ring 432, is greater than in a case in which the lock pawl 324 engages with the Nth ratchet teeth 314A and the W-pawl 362 engages with the Nth internal tooth 434.

At the webbing retractor 310, the magnitude of the angle of intersection θ between the tooth surface 438B of the release pawl 438 and the tooth surface 436A of the external tooth 436 is set such that the condition of following formula (1) is satisfied in a case in which the lock pawl 324 engages with the Nth ratchet teeth 314A and the W-pawl 362 engages with the Nth internal tooth 434, and the condition of following formula (2) is satisfied in a case in which the lock pawl 324 engages with the Nth ratchet teeth 314A and the W-pawl 362 engages with the (N−1)st internal tooth 434.

$$T\mu + Ts > Tt \quad (1)$$

$$T\mu + Ts < Tt \quad (2)$$

At the webbing retractor 310, at the time when the lock pawl 324 engages with the ratchet teeth 314A of the frame 312 interlockingly with sudden pulling-out of the webbing belt 318, when the lock pawl 324 engages with the Nth ratchet teeth 314A and the W-pawl 362 engages with the (N−1)st internal tooth 434 and the transmitted load F is applied between the release pawl 438 and the external tooth 436 of the gear ring 432, the release pawl 438 is moved from the restraining position to the restraint cancelled position against the urging force of the torsion coil spring 442 and due to the torque Tt which the tooth surfaces 436A, 438B generate.

When the gear ring 432 rotates due to restoring force to the position at which the phase difference with the spool 316 substantially disappears, the release pawl 438 is returned to the restraining position by the urging force of the torsion coil spring 442.

In this way, when the lock pawl 324 engages with the Nth ratchet teeth 314A and the W-pawl 362 engages with the (N−1)st internal tooth 434, the release pawl 438 is immediately moved apart once from the external tooth 436, the engagement between the W-pawl 362 which is at the connected position and the internal tooth 434 of the gear ring 432 is cancelled, and the release pawl 438 can be made to engage again with the Nth external tooth 436 at the time when the gear ring 432 rotates to the position where the phase difference substantially disappears.

As a result, in accordance with the webbing retractor 310, even in a case in which a phase difference arises at the portions from the spool 316 to the gear ring 432, and the lock pawl 324 engages with the Nth ratchet teeth 314A and the W-pawl 362 engages with the (N−1)st internal tooth 434, the restoring force, which accompanies the occurrence of the phase difference and which was applied as well between the W-pawl 362 and the internal tooth 434 of the gear ring 432, can also be eliminated.

What is claimed is:

1. A webbing retractor comprising:

a spool on which an elongated belt-shaped webbing is taken-up, and which is rotatable in a take-up direction and in a pull-out direction that is opposite to the take-up direction;

a first rotating body that is disposed coaxially with the spool and is rotatable relative to the spool;

a phase adjusting mechanism that includes a second rotating body that is disposed coaxially with the spool and is rotatable relative to the spool, and a first pawl that can connect the second rotating body to the locking mechanism, said first pawl being urged by an urging member that urges the first pawl with a predetermined urging force in a direction of engaging the first pawl to the second rotating body, said first pawl releasing a connection of the second rotating body to the locking mechanism when the first pawl receives a load of a predetermined value or more from the second rotating body after the locking mechanism activates, and re-connecting the second rotating body to the locking mechanism when the load from the second rotating body is reduced to zero at the pawl;

a rotation controlling mechanism that stops rotation of the first rotating body in at least either one of a case where rotation of the spool in the pull-out direction exceeds a predetermined speed or a case where rapid deceleration of a vehicle is detected, including an inertial body that is relatively movable with respect to the first rotating body in at least either one of the case where rotation of the spool in the pull-out direction exceeds the predetermined speed or the case where rapid deceleration of the vehicle is detected, and a second pawl that is able to engage with the second rotating body due to the relative movement of the inertial body; and a locking mechanism that, when the first rotating body rotates relative to the spool due to actuation of the rotation controlling mechanism, impedes rotation of the spool in the pull-out direction by actuation such that a phase of the locking mechanism is as the same as that of the rotation controlling mechanism, and wherein said phase adjusting mechanism adjusts phases of the rotation controlling mechanism and the locking mechanism such that the rotation controlling mechanism and the locking mechanism activate at the same phase, said phase adjusting mechanism adjusting the phase of the rotation controlling mechanism and phase of the locking mechanism by allowing rotation of the second rotating body, the rotation of the second rotating body being allowed by the first pawl releasing connection of the second rotating body to the locking mechanism when the first pawl receives the load of the predetermined value or more from the second rotating body after the locking mechanism activates.

2. The webbing retractor of claim 1, wherein:

when the first pawl receives a load of the predetermined value or more from the second rotating body after the locking mechanism activates, the first pawl moves to an engaging-released position, at which engaging of the first pawl and the second rotating body is released against the urging force, so as to allow rotation of the second rotating body; and thereafter, due to the first pawl not receiving load from the second rotating body due to releasing of engaging of the first pawl and the second rotating body, the first pawl moves to an engaging position, at which the first pawl engages with the second rotating body, due to the urging force.

3. The webbing retractor of claim 2, wherein:

a plurality of inner teeth are formed at an inner peripheral surface along a peripheral direction at the second rotating body, and a plurality of outer teeth are formed at an outer peripheral surface along the peripheral direction at the second rotating body;

the first pawl is able to mesh with the outer teeth of the second rotating body;

the locking mechanism includes
a ratchet member that is connected to the spool coaxially so as to rotate integrally with the spool, and at which a plurality of ratchet teeth are formed along a peripheral direction, and
a lock pawl that is able to mesh with the ratchet teeth of the ratchet member; and wherein the second pawl that is able to mesh with the inner teeth of the second rotating body is provided at the first rotating body.

4. The webbing retractor of claim 3, wherein angles of meshed surfaces of the first pawl and the outer teeth of the second rotating body are determined such that meshing of the first pawl and the outer teeth of the second rotating body is released when the first pawl receives a load of the predetermined value or more from the second rotating body.

5. The webbing retractor of claim 3, wherein, due to the a phase difference being generated between the rotation controlling mechanism and the locking mechanism, when the first pawl moves to the engaging-release position, the second rotating body is rotated by peripheral force generated between the spool and the second rotating body.

* * * * *